United States Patent
Iwasaki et al.

(10) Patent No.: US 6,483,673 B1
(45) Date of Patent: *Nov. 19, 2002

(54) DIFFERENTIAL DETECTION MAGNETORESISTANCE HEAD WITH LAMINATED STRUCTURE

(75) Inventors: Hitoshi Iwasaki, Yokosuka (JP); Yuichi Ohsawa, Tokyo (JP); Reiko Kondoh, Yokohama (JP); Yuzo Kamiguchi, Yokohama (JP); Susumu Hashimoto, Ebina (JP); Tomomi Funayama, Fujisawa (JP); Hiromi Fuke, Kawasaki (JP); Junichi Akiyama, Kawasaki (JP); Kazuhiro Saito, Yokohama (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,101

(22) Filed: May 28, 1998

Related U.S. Application Data

(62) Division of application No. 08/401,489, filed on Mar. 10, 1995, now Pat. No. 5,828,525.

(30) Foreign Application Priority Data

Mar. 15, 1994 (JP) .......................................... P6-043483

(51) Int. Cl.[7] ................................................ G11B 5/39
(52) U.S. Cl. ................................................ 360/324.11
(58) Field of Search .............................. 360/113, 324.2, 360/324.12, 324.1, 324.11, 324; 338/32 R; 324/252

(56) References Cited

U.S. PATENT DOCUMENTS

| 3,860,965 A | | 1/1975 | Voegeli ........................ 360/113 |
| 5,287,238 A | | 2/1994 | Baumgart et al. ........... 360/113 |
| 5,313,186 A | * | 5/1994 | Schuhl et al. .............. 338/32 R |
| 5,442,508 A | | 8/1995 | Smith .......................... 360/113 |
| 5,476,680 A | | 12/1995 | Coffey et al. ............... 427/130 |
| 5,510,172 A | * | 4/1996 | Araki et al. ................. 428/213 |
| 5,514,452 A | | 5/1996 | Araki et al. ................. 428/213 |

FOREIGN PATENT DOCUMENTS

DE       43 14 537 A1       11/1994

\* cited by examiner

*Primary Examiner*—David Davis
(74) *Attorney, Agent, or Firm*—Finnegan, Henderson, Farabow, Garrett & Dunner, L.L.P.

(57) ABSTRACT

A GMR element part is formed of a laminated structure which comprises at least one pair of ferromagnetic layers and a nonmagnetic intermediate layer interposed between the pair of ferromagnetic layers. Signal magnetic field detecting ferromagnetic layers will be optionally disposed one each outside the pair of ferromagnetic layers. The GMR element part consists of a laminated structure which is provided with one pair of GMR ferromagnetic layers opposed to each other across a nonmagnetic intermediate layer or a laminated structure which is provided with one pair of GMR ferromagnetic layer opposed to each other across a nonmagnetic intermediate layer and at least one low-permeability ferromagnetic layer disposed there between through the medium of a nonmagnetic intermediate layer. The GMR element part functions as a read head for sensing the resistance which is varied when signal magnetic fields of mutual opposite directions are applied to the pair of GMR ferromagnetic layers and displaying a differential detection type output response. A granular type ferromagnetic intermediate layer will be used as the GMR element part.

1 Claim, 10 Drawing Sheets

DIFFERENTIAL DETECTION MAGNETORESISTANCE HEAD WITH LAMINATED STRUCTURE

This is a division of application Ser. No. 08/401,489, filed Mar. 10 1995, now U.S. Pat. No. 5,828,525 which is incorporated herein by reference.

BACKGROUND OF THE INVENTION

1. Field of the Invention

This invention relates to a magnetoresistance head for use in magnetic recording devices, VTR's, etc. The invention relates more particularly to a differential detection type magnetoresistance head.

2. Description of the Related Art

In recent years, the trend of recording tracks toward a decreasing width and that of recording wavelengths toward an increasing frequency have been urging magnetic recording devices such as, for example, hard disc devices to use a further improved recording density. When the width of the recording track is decreased, the sensitivity of the read head is required to be further enhanced because the decrease of the track width entails a decrease in the amount of signal magnetic flux from the magnetic recording medium. As read heads endowed with such high sensitivity, the magnetoresistance heads (hereinafter referred to as "MR head") have been attracting attention.

In the MR heads, the MR heads (GMR heads) of the type using the so-called giant magnetoresistance (hereinafter referred to as "GMR") and having a large rate of change in resistance as compared with the MR heads of the type using the anisotropic magnetoresistance (hereinafter referred to as "AMR") are expected to find recognition as magnetic heads promising high read sensitivity in the future.

For the purpose of improving the linear record resolving power with the shield type MR head which currently prevails in the existing MR heads, the interval or gap between the shield layer possessed of high permeability and the MR element must be decreased. In this case, it is extremely difficult to decrease this interval to or even below 0.1 $\mu$m, with maintaining good electric insulation between the shield layer and the MR element. Thus, the shield type MR head has its limit to the improvement of the linear record dissolving power.

As a breakthrough, the so-called dual element type MR head which has two MR elements superposed through the medium of a nonmagnetic intermediate layer has been proposed. This dual element type MR head generates a so-called differential detection type output response by virtue of the phenomenon that it produces a change in the resistance only when the magnetic recording medium applies signal magnetic fields of opposite directions to the two MR elements, whereas it produces no change in the resistance when this medium applies signal magnetic fields of one same direction thereto. The differential detection type MR head has the read resolving power thereof governed by the thickness of the nonmagnetic intermediate layer and, unlike the shield type MR head, requires the two MR elements thereof to be insulated from each other magnetically and not electrically. The differential detection type MR head, therefore, allows the thickness of the nonmagnetic intermediate layer to be notably decreased, for example, to or even below 10 nm. As a result, it is capable of reading an unusually high linear recording density.

Among the conventional differential detection type MR heads is counted the MR head which uses two AMR elements possessing substantially identical magnetoresistance characteristics (MR characteristics). When the AMR elements are used, such operating point bias magnetic fields as rotate their magnetization in opposite directions like about +45° and −45° from the direction of width of the track are applied. The differential detection type MR head can be realized as a result.

It is suspected, however, that the sensitivity obtainable with the conventional differential detection type MR head using AMR elements will prove insufficient in the near future because the inflow of a signal magnetic field (medium magnetic field) to the upper part of the MR element is not attained when the thickness of the nonmagnetic intermediate layer is decreased. Further, since this MR head necessitates application of the operating point bias magnetic field of the nature mentioned above, it has the problem of encountering difficulty in the impartation and the adjustment of the magnetic field.

The differential detection type MR head using AMR elements is generally constructed by superposing two AMR layers through the medium of a nonmagnetic intermediate layer and forming a pair of electrodes for the supply of a sense current on the upper AMR layer. For the AMR elements in this construction, the angles between the currents and the magnetization constitute themselves an important factor. In order to equalize substantially the MR characteristics of the two AMR elements in the differential detection type MR head, therefore, it is necessary that the characteristics of the two AMR layers themselves be rendered uniform and no angle be formed in the directions of sense currents supplied between the two AMR layers. In the case of the construction in which the electrodes are formed as superposed on one of the AMR layers as described above, the upper and the lower AMR layer produce a difference in the current distribution (as in direction) and the directions of sense currents between these two AMR layers are liable to form an angle. Even when magnetic fields of identical directions are applied to the two AMR layers, therefore, the possibility ensues that the resistance will be varied and this variation will be emitted in the form of a signal. The accidental detection of this erroneous signal possibly results in generation of noise.

Since the conventional differential detection type MR head uses two AMR elements as described above, it entails the problem of readily degrading the sensitivity thereof owing to the fact that the depth of permeation of a signal magnetic field decreases and the fact that the directions of currents between the two AMR layers are inclined toward each other and also the problem of complicating the impartation and the adjustment of the operating point bias magnetic field.

SUMMARY OF THE INVENTION

An object of this invention, therefore, is to provide a differential detection type magnetoresistance head which not only possesses improved line resolving power (read resolving power) but also realizes high sensitivity and high S/N ratio under high reliability.

The magnetoresistance head of the present invention is a differential detection type magnetoresistance head which comprises a magnetoresistance element having a laminated structure comprising at least one pair of ferromagnetic layers and an intermediate layer interposed between the pair of ferromagnetic layers and formed of either a nonmagnetic intermediate layer or a granular type ferromagnetic intermediate layer separated into a magnetic region and a nonmagnetic region, the magnetoresistance element part permitting the resistance thereof substantially varied when signal magnetic fields of mutually opposite directions are applied to the pair of ferromagnetic layers, characterized in that the signal magnetic fields are detected by utilizing the variation of resistance based on the giant magnetoresistance due to the spin-dependent scattering in the magnetoresistance element part.

The nonmagnetic intermediate layer as used in the present invention excludes that which is formed of an antiferromagnetic material as well as that which is formed of a ferromagnetic material.

The differential detection type MR head of this invention can be broadly divided into the following three forms. The first form is such that a laminated structure comprising a pair of ferromagnetic layers excelling in the spin-dependent scatting ability (hereinafter referred to as "GMR ferromagnetic layer") and a nonmagnetic intermediate layer interposed between the pair of GMR ferromagnetic layers and possessed of low resistance fit for spin-dependent scattering (hereinafter referred to as "GMR nonmagnetic intermediate layer") is caused to function as a magnetoresistance element part exhibiting a giant magnetoresistance due to the spin-dependent scattering (hereinafter referred to as "GMR element part").

The second form is such that a laminated structure comprising at least three ferromagnetic layers and nonmagnetic intermediate layers each interposed between the adjacent pairs of the ferromagnetic layers and having the ferromagnetic layers each formed of at least two GMR ferromagnetic layers and at least one low-permeability ferromagnetic layer having the magnetization thereof not substantially varied by a signal magnetic field is caused to function as a GMR element part.

The third form is such that a granular type ferromagnetic intermediate layer separated into a magnetic region and a nonmagnetic region is caused to function as a GMR element part. In this form, the pair of ferromagnetic layers which are opposed to each other across the granular type ferromagnetic intermediate layer are used as ferromagnetic layers for the detection of a signal magnetic field.

The first form of this invention is desired to generate a ferromagnetic coupling force between the pair of GMR ferromagnetic layers and cause the magnetizations of the two GMR ferromagnetic layers to be arranged in substantially identical directions with a signal magnetic field in a state of zero. The ferromagnetic coupling force between the two GMR ferromagnetic layers can be adjusted to a required magnitude by controlling the thickness of the nonmagnetic intermediate layer. The parallel arrangement of the directions of magnetizations may be attained by application of a bias magnetic field. The impartation of the bias magnetic field can be effected by causing a hard ferromagnetic film such as of CoPt or an antiferromagnetic film such as of FeMn or NiO to be disposed closely to or superposed on the GMR element part.

Incidentally, in the standard conventional GMR multilayered film which has ferromagnetic layers and nonmagnetic intermediate layers superposed alternately and utilizes the antiferromagnetic coupling between the ferromagnetic layers, the magnetizations of the ferromagnetic layers are antiferromagnetically arranged with a signal magnetic field in a state of zero. This GMR head cannot be expected to detect a differential detection type signal magnetic field because the magnetizations of the ferromagnetic layers are rotated toward ferromagnetic arrangements and the resistance is consequently varied when signal magnetic fields of equal directions are applied to all the ferromagnetic layers.

The GMR ferromagnetic layers in the differential detection type MR head of the first form may concurrently serve as ferromagnetic layers for the detection of signal magnetic fields. The MR head nevertheless is desired to have a structure such that, apart from the GMR ferromagnetic layers, ferromagnetic layers exclusively used for the detection of signal magnetic fields are severally disposed outside the GMR ferromagnetic layers. Specifically, a laminated structure of GMR ferromagnetic layer/nonmagnetic intermediate layer/GMR ferromagnetic layer is used as the GMR element part and ferromagnetic layers for the detection of signal magnetic fields are severally disposed outside the GMR element part. In this case, the GMR ferromagnetic layers and the ferromagnetic layers for the detection of signal magnetic fields are desired to be exchange coupled.

The ferromagnetic layers for the detection of signal magnetic fields mentioned above are desired to be made of a ferromagnetic material possessing higher permeability than the GMR ferromagnetic layers. Desirably, a pair of ferromagnetic layers for the detection of signal magnetic fields be formed protrudingly on the opposed medium surfaces and the GMR element part be made to recede from the opposed surface of the medium. Owing to this arrangement, the GMR element part having the aforementioned laminated structure can be made to function as a substantial gap. In the case of this arrangement, the thickness of the GMR element part is set with due respect to the fact that the GMR element part functions as a substantial gap. In order to accomplish a high recording density of the order of 4 to 10 Gb/in$^2$, for example, it is desired to give the GMR element part a thickness which is in the approximate range of from 10 to 100 nm.

Then, the ferromagnetic layers for the detection of signal magnetic fields are desired to be made of a material which has higher resistance than the GMR ferromagnetic layers, namely a material having resistivity exceeding 100 $\mu\Omega$cm. Owing to the use of this material, the ferromagnetic layers for the detection of signal magnetic fields are enabled to acquire exalted sensitivity because the material is capable of repressing the partial sense current flow into the layers. Further, it is advantageous that the ferromagnetic layers for the detection of signal magnetic fields be formed of ferromagnetic layers which have a larger thickness than the GMR ferromagnetic layers. In this case, the detection of signal magnetic fields is facilitated because such adverse magnetic effects as the degradation of permeability due to the exchange coupling with the GMR ferromagnetic layers can be diminished.

The differential detection type MR head of the first form mentioned above, unlike the conventional GMR multilayered film, enables the magnetizations of the pair of GMR ferromagnetic layers to assume substantially equal directions with the signal magnetic fields in a state of zero as by exerting a ferromagnetic coupling force between the GMR ferromagnetic layers. In the case of a perpendicular magnetic recording medium, for example, since signal magnetic fields of equal directions are applied to the two GMR ferromagnetic layers when the differential detection type MR head departs from the magnetization transition region of the magnetic recording medium, the angle formed by these magnetizations is not varied and substantially no variation occurs in the resistance. When at least the GMR nonmagnetic intermediate layers directly overlie the magnetization transition region of the magnetic recording medium, signal magnetic fields of mutually opposite directions are applied to the two GMR ferromagnetic layers and the magnetizations corresponding thereto are rotated in different directions. As a result, the angle formed by the magnetizations of the two GMR ferromagnetic layers is varied and the resistance is varied largely. Thus, the detection of recorded information can be attained exclusively with the magnetization transition region of the magnetic recording medium. Particularly, the perpendicular magnetic recording medium of the type which produces an abrupt signal magnetic field transition in the magnetization transition region thereof is enabled to attain read back signals with markedly high resolving power and enjoy generous improvement of linear recording density.

Thus, the differential detection type MR head of the first form, unlike the conventional differential detection type MR head using an AMR element operated by virtue of the resistance which varies proportionately to the angle formed by the current and the magnetization, produces a differential detection by utilizing the resistance variable proportionately to the angle formed by the magnetizations of one pair of GMR ferromagnetic layers instead of relying on the directions of currents. It, therefore, can realize the high read sensitivity which has never been attained by the conventional AMR element. As a result, the noise which originates in the mutual inclination of the directions of currents occurring between the two AMR layers and which has posed a problem to the differential detection type MR head using the conventional AMR element no longer occurs in the differential detection type MR head of the first form. Then, this high read sensitivity can be realized with an extremely simple head structure.

Further, in the differential detection type MR head of the first form, when ferromagnetic layers for the detection of signal magnetic fields are severally disposed outside the GMR element part formed of a laminated structure of GMR ferromagnetic layer/nonmagnetic intermediate layer/GMR ferromagnetic layer, the GMR element part can be made to function as a substantial gap and the gap length, therefore, can be enlarged. As a result, the adaptation of the gap length for the length of the magnetization transition region of the magnetic recording medium and the high read sensitivity can be both fulfilled without contradiction. When the nonmagnetic intermediate layer is made to function by itself to function as a gap, the ratio of variation of the resistance in the GMR element part formed of a laminated structure of GMR ferromagnetic layer/nonmagnetic intermediate layer/ GMR ferromagnetic layer will be degraded if the thickness of the nonmagnetic intermediate layer is increased to or even over 5 nm, for example. The result possibly may be that the adaptation of the gap length (of the order of from 10 to 100 nm) for the length of the magnetization transition region of the magnetic recording medium and the high read sensitivity will be simultaneously fulfilled with difficulty.

When the resistance of the ferromagnetic layers for the detection of signal magnetic fields is higher than that of the GMR ferromagnetic layers, the partial sense current flow to the ferromagnetic layers for the detection of signal magnetic fields can be repressed and the sensitivity of the ferromagnetic layers can be enhanced. The direct rotation of magnetizations by the signal magnetic fields of the GMR ferromagnetic layers can be repressed either by forming the ferromagnetic layers for the detection of signal magnetic fields with a ferromagnetic material having higher permeability than the GMR ferromagnetic layers or by causing the GMR element part to recede from the opposed surface of the medium. As a result, the gap length can be more precisely regulated by the thickness of the GMR element part because the rotation of magnetizations of the GMR ferromagnetic layers is predominantly governed as by the exchange coupling bias magnetic fields with the ferromagnetic layers for the detection of signal magnetic fields.

As more specific structures of the GMR element part in the differential detection type MR head of the second form, (1) a structure having a GMR ferromagnetic layer, a GMR nonmagnetic intermediate layer, a low-permeability ferromagnetic layer having the magnetization not substantially varied by a signal magnetic field (hereinafter referred to simply as "low-permeability ferromagnetic layer", a GMR nonmagnetic intermediate layer, and a GMR ferromagnetic layer sequentially superposed in the order mentioned, (2) a structure having a GMR ferromagnetic layer, a GMR nonmagnetic intermediate layer, a low-permeability ferromagnetic layer, a nonmagnetic intermediate layer capable of weakening ferromagnetic coupling between adjacent ferromagnetic layers (hereinafter referred to as "separating nonmagnetic intermediate layer"), a low-permeability ferromagnetic layer, a GMR nonmagnetic intermediate layer, and a GMR ferromagnetic layer sequentially superposed in the order mentioned, and (3) a structure having a low-permeability ferromagnetic layer, a GMR nonmagnetic intermediate layer, a GMR ferromagnetic layer, a separating nonmagnetic intermediate layer, a low-permeability ferromagnetic layer, a GMR nonmagnetic intermediate layer, and a GMR ferromagnetic layer sequentially superposed in the order mentioned may be cited.

In the structure of (1) mentioned above, the magnetization of the low-permeability ferromagnetic layer, for example, is effected in the direction of track width and the magnetizations of the two GMR ferromagnetic layers are inclined by angles of about +45° and −45°, for example, from the direction of track width as by means of a sense current magnetic field with the signal magnetic field in a state of zero. As a result, the detection of signals with high linear response region, low distortion, and high S/N ratio can be carried out. In the structures of (2) and (3), the two low-permeability ferromagnetic layers are desired to be magnetized in directions substantially perpendicular to the medium surface and differing mutually by 180°. Owing to the magnetization so effected, the magnetization stability of the low-permeability ferromagnetic layers to resist the signal magnetic fields is improved because the low-permeability ferromagnetic layer which is magnetized in the direction opposite to the direction in which the signal magnetic field is applied is exposed to the leak magnetic field emanating from the other low-permeability ferromagnetic layer in the direction tending to cancel the signal magnetic field. These structures are further at an advantage in acquiring a linear magnetic field-resistance characteristics in a wide range of magnetic fields without necessarily causing the magnetizations of the GMR ferromagnetic fields to be inclined in the directions of ±45°.

For the low-permeability ferromagnetic layers mentioned above, a ferromagnetic material having permeability of not more than $\frac{1}{10}$ of the permeability of the GMR ferromagnetic layer is used. Specifically, hard ferromagnetic materials and semi-hard ferromagnetic materials are concrete examples of the material answering the description. The low-permeability ferromagnetic layers are desired to have permeability of not more than about 100. For the formation of the low-permeability ferromagnetic layers, it is particularly desirable to use a ferromagnetic material which excels in the spin-dependent scattering ability and allows impartation of high coercive force and large uniaxial magnetic anisotropy. The use of this material for the layers is not indispensable when any of the following structures is adopted for the layers.

For the purpose of preventing the magnetizations of the low-permeability ferromagnetic layers from being affected by signal magnetic fields while keeping their large resistance variations intact, such structures as are enumerated below may be adopted, for example. Namely, (a) a structure in which at least the part of the low-permeability ferromagnetic layers is made to recede from the opposed surface of the medium, (b) a structure in which the low-permeability ferromagnetic layers are each formed of an alternate superposition of a ferromagnetic film and a nonmagnetic film and the thicknesses of the nonmagnetic films are optimized and, as a result, a large antiferromagnetic coupling desirably of a coupling magnetic field of not less than about 80000 A/m, a magnitude larger than the signal magnetic field, is enabled by dint of the so-called Ruderman-Kittel-Kasuya-Yoshida (RKKY) exchange interaction to occur between the adjacent ferromagnetic films, (c) a structure in which low-permeability ferromagnetic layers capable of imparting high coercive force and large uniaxial magnetic anisotropy and ferromagnetic films excelling in the spin-dependent scattering ability are superposed, and (d) a structure in which a film adapted for impartation of high coercive force and uniaxial magnetic anisotropy to either of the low-permeability ferromagnetic layers of the construction of (3) is interposed between this low-permeability ferromagnetic layer and a substrate and, at the same time, a film adapted for impartation of high coercive force and uniaxial magnetic anisotropy to the other low-permeability ferromagnetic layer is used for a separating nonmagnetic intermediate layer destined to form the foundation for this other low-permeability ferromagnetic layer may be cited.

In the differential detection type MR head of the second form described above, when the magnetizations of the two GMR ferromagnetic films are rotated in the same direction in conformity to the signal magnetic fields generated in the same direction, the angles formed by the magnetizations relative to the low-permeability ferromagnetic layers opposed to each other across the GMR nonmagnetic intermediate layer increase on the one GMR ferromagnetic layer side and decrease on the other GMR ferromagnetic layer side. As a result, the signal magnetic fields are not detected because the resistance is not varied substantially. When the signal magnetic fields are applied in opposite directions on the two GMR ferromagnetic layers, the angles formed by the magnetizations of the two GMR ferromagnetic layers respectively with the low-permeability ferromagnetic layers opposed to each other across the GMR nonmagnetic intermediate layer are simultaneously increased or decreased. As a result, notably large resistance variations are caused by the spin-dependent scattering. In other words, a differential detection type signal detection system of high sensitivity using GMR elements can be realized. Likewise, in the differential detection type MR head of this second form, the current distribution within the laminated structure avoids exerting an effect on sensitivity or other factors because the differential detection is generated by fundamentally utilizing the resistance which varies with the angles formed by the two magnetizations.

Further, the gap length can be regulated by the interval between the two GMR ferromagnetic layers because the part of GMR nonmagnetic intermediate layer, low-permeability ferromagnetic layer, and separating nonmagnetic intermediate layer which intervenes between the two GMR ferromagnetic layers has notably small permeability with respect to the signal magnetic fields. A proper gap length of the order of from 10 to 100 nm can be fixed proportionately to the linear recording density as by adjusting the thickness of the separating nonmagnetic intermediate layer. All the factors mentioned above boil down to a conclusion that a differential detection type MR head of high sensitivity and high S/N ratio can be realized and the linear recording density can be improved as well.

In the differential detection type MR head of the third form, a granular type ferromagnetic intermediate layer which is divided into a magnetic region formed mainly of Co, Ni, Fe, etc., for example, and a nonmagnetic region formed of Cu, Au, Ag, and alloys thereof, for example, is used. As ferromagnetic layers for the detection of signal magnetic fields which are opposed to each other across this granular type ferromagnetic intermediate layer, those which are used in the structure of the first form are used.

In the differential detection type MR head of the third form, since the granular type ferromagnetic intermediate layer serving as a GMR element part is equivalent to a substantial gap, the thickness of the GMR element part is to be set in consideration of this equivalency. To attain a high recording density falling in the approximate range of from 4 to 10 $Gb/in^2$, for example, the thickness of the granular type ferromagnetic intermediate layer is desired to be selected in the approximate range of from 10 to 100 nm. The granular type ferromagnetic intermediate layer and the ferromagnetic layers for the detection of signal magnetic fields are desired to be exchange coupled across the interfaces thereof. In the same manner as in the structure of the first form, the GMR element part or the granular type ferromagnetic intermediate layer is desired to be withdrawn from the opposed surface of the medium.

The magnetizations within the granular type ferromagnetic intermediate layer are desired to assume substantially equal directions with the signal magnetic fields in a state of zero. The desire is satisfied as by inducing a ferromagnetic coupling force between the pair of ferromagnetic layers for the detection of signal magnetic fields or applying a bias magnetic field thereto. The ferromagnetic coupling force between the pair of ferromagnetic layers for the detection of signal magnetic fields can be adjusted to a necessary magnitude by regulating the state of dispersion of a magnetic region in a nonmagnetic region within the granular type ferromagnetic intermediate layer, specifically by controlling the interval between the adjacent magnetic regions. The bias magnetic field can be imparted as required by causing a hard ferromagnetic film formed of CoPt to be disposed closely to or superposed on or an antiferromagnetic film formed of FeMn or NiO to be disposed closely to the granular type ferromagnetic intermediate layer.

In the differential detection type MR head of the third form, owing to the exchange coupling between the ferromagnetic layers for the detection of signal magnetic fields and the granular type ferromagnetic intermediate layer, the magnetization of the magnetic region of the granular type ferromagnetic intermediate layer gains in susceptibility to the force exerted in the same direction as the magnetization of the ferromagnetic layers for the detection of signal magnetic fields in proportion as the proximity thereof to the ferromagnetic layers for the detection of signal magnetic fields grows. When the magnetizations of the two ferromagnetic layers for the detection of signal magnetic fields fall in substantially equal directions (as when signal magnetic fields are substantially in a state of zero), the magnetizations of the magnetic region of the granular type ferromagnetic intermediate layer assume uniform directions. When signal magnetic fields of equal directions are applied to the two ferromagnetic layers for the detection of signal magnetic fields, therefore, the magnetizations of the magnetic region of the granular type ferromagnetic intermediate layer are rotated as kept in equal directions because the magnetizations of the two ferromagnetic layers for the detection of signal magnetic fields are rotated as kept in equal directions. As a result, the resistance is not varied. When signal magnetic fields of opposite directions are applied instead to the two ferromagnetic layers for the detection of signal magnetic fields, the magnetizations of the magnetic region of the granular type ferromagnetic intermediate layer are rotated in directions differing mutually by 180° near the interfaces with the ferromagnetic layers for the detection of signal magnetic fields proportionately to the rotation of the magnetizations of the ferromagnetic layers for the detection of signal magnetic fields. Since the parts of the magnetizations of the magnetic region which deviate from the equal directions increase, the resistance of the granular type ferromagnetic intermediate layer increases. As a result, the differential detection type MR head can be realized because the detection of signals is attained only when signal magnetic fields of opposite directions are applied.

Further, since the granular type ferromagnetic intermediate layer has small permeability, it is allowed to function as a substantial gap. The reading of signal magnetic fields with high sensitivity and high resolution, therefore, is accomplished by adjusting the thickness of the granular type ferromagnetic intermediate layer to a proper magnitude fit for linear recording density. Further by causing the granular type ferromagnetic intermediate layer to recede from the opposed surface of the medium, the signal magnetic fields which are directly sensed by the granular type ferromagnetic intermediate layer (GMR element part) grow weak and the gap length can be regulated more precisely by the thickness of the granular type ferromagnetic intermediate layer. In the differential detection type MR head of the third form likewise, the current distribution within the laminated structure exerts no adverse effect on sensitivity and other factors because the differential detection is principally implemented by utilizing the resistance which varies with the angles to be formed by the magnetizations of the magnetic region of the granular type ferromagnetic intermediate layer.

DESCRIPTION OF THE PREFERRED EMBODIMENTS

Next, this invention will be further described specifically below with reference to embodiments.

Figure 1:
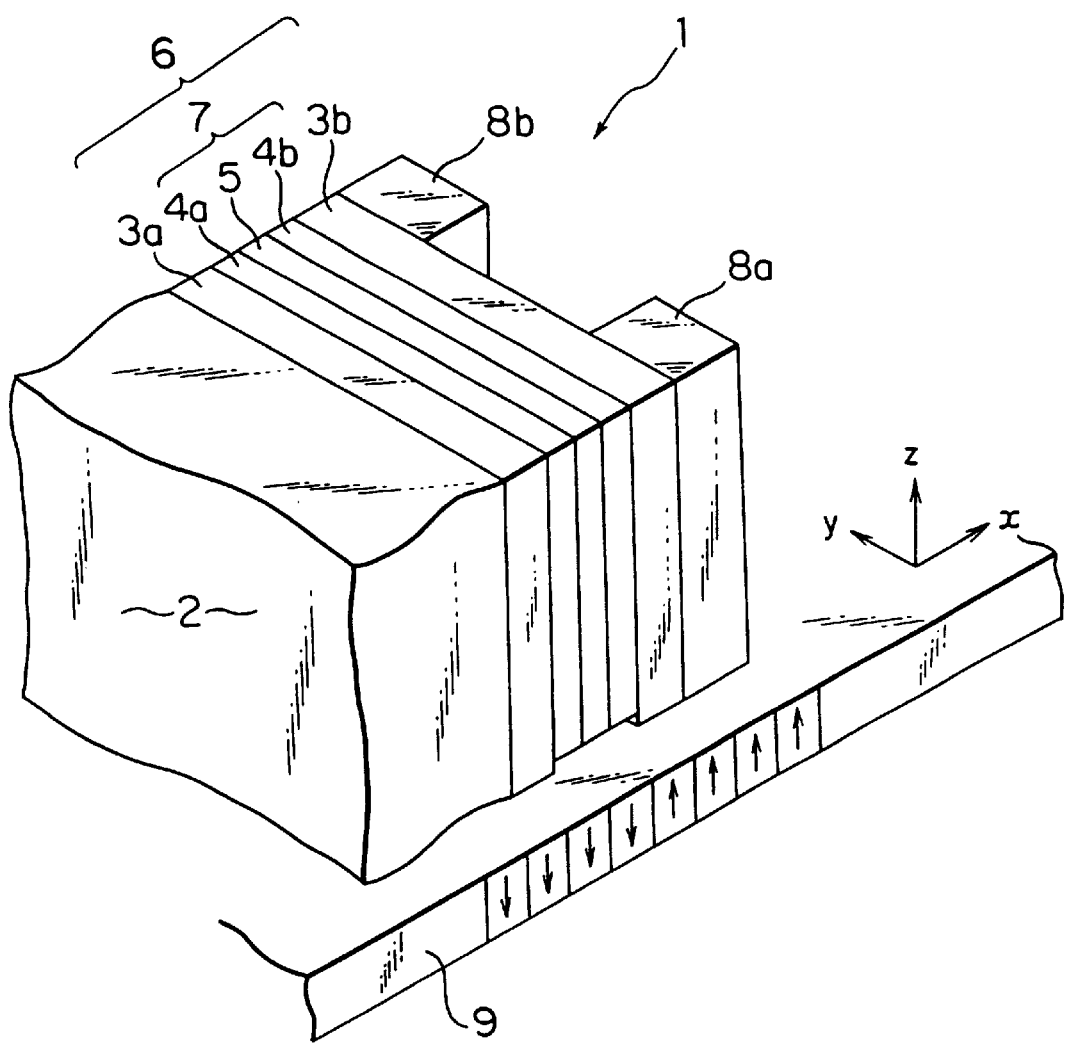
FIG. 1 is a perspective view illustrating the essential construction of a differential detection type MR head as the first embodiment of this invention.

The first embodiment of this invention will be described with reference to FIG. 1. In a differential detection type MR head 1 shown in FIG. 1, a first signal magnetic field detecting ferromagnetic layer 3a adapted to have the magnetization thereof rotated by a signal magnetic field, a first GMR ferromagnetic layer 4a, a GMR nonmagnetic intermediate layer 5, a second GMR ferromagnetic layer 4b, and a second signal magnetic field detecting ferromagnetic layer 3b adapted to have the magnetization thereof rotated by a signal magnetic field similarly to the first signal magnetic field detecting ferromagnetic layer 3a are sequentially superposed in the order mentioned on a substrate 2 to complete a differential detection type MR element 6. The first signal magnetic field detecting ferromagnetic layer 3a and the first GMR ferromagnetic layer 4a are exchange coupled and the second GMR ferromagnetic layer 4b and the second signal magnetic field detecting ferromagnetic layer 3b are likewise exchange coupled.

A laminated structure consisting of the first GMR ferromagnetic layer 4a, the GMR nonmagnetic intermediate layer 5, and the second GMR ferromagnetic layer 4b constitutes itself a GMR element part 7. This GMR element part 7 is otherwise called GMR unit. Further at the opposite ends of the differential detection type MR element 6, electrodes 8a and 8b for feeding sense current are formed to give rise to the differential type MR head 1.

For the first and the second GMR ferromagnetic layer 4a and 4b, it is desirable to use a CoFe alloy, Co, a CoFeNi alloy, etc. which have relatively low permeability than a NiFe alloy, etc. which have high permeability. These GMR ferromagnetic layers manifest an excellent spin-dependent scattering ability in the interfaces thereof with the GMR nonmagnetic intermediate layer 5. The GMR ferromagnetic layers 4a and 4b are desired to have a thickness in the approximate range of from 4 to 40 nm. If the GMR ferromagnetic layer 4a and 4b have a thickness of less than 4 nm, a gap length (of the order of 10 to 100 nm, for example) adapted for the linear recording density aimed at will not be easily set in spite of the provision of the signal magnetic field detecting ferromagnetic layers 3a and 3b, in addition to the decrease in the MR ratio. Conversely, if they have a thickness exceeding 40 nm, the ratio of variation of the resistance will be possibly degraded markedly. The fits and the second GMR ferromagnetic layer 4a and 4b are specifically formed of a CoFe alloy film, a Co film, a CoFeNi alloy film and the like which have a thickness of about 10 nm.

For the GMR nonmagnetic intermediate layer 5, a Cu film, a Au film, a Ag film, and films of alloys formed mainly of these metals which are adapted for the spin-dependent scattering can be used. The thickness of the GMR nonmagnetic intermediate layer 5 is desired to be in the approximate range of from 2 to 5 nm. If the thickness of the GMR nonmagnetic intermediate layer 5 exceeds 5 nm, the ferromagnetic coupling force between the first and the second GMR ferromagnetic layer 4a and 4b will be possibly decreased and the ratio of variation of the resistance lowered. If the thickness of the GMR nonmagnetic intermediate layer 5 is less than 2 nm, the ferromagnetic coupling force between the first and the second GMR ferromagnetic layer 4a and 4b will grow excessively. In this case, there ensues the possibility that the magnetizations of the first and the second GMR ferromagnetic layers 4a and 4b will be arranged antiferromagnetically only with difficulty and the ratio of variation of the resistance will be consequently decreased when magnetic fields of mutually opposite directions are applied to these layers 4a and 4b.

It is generally known that in a GMR multilayered film obtained by superposing ferromagnetic layers of Co film through the medium of a nonmagnetic intermediate layer, a ferromagnetic coupling force and an antiferromagnetic coupling force periodically act between the adjacent ferromagnetic layers proportionately to the thickness of the nonmagnetic intermediate layer. Generally, in the case of applying such a GMR multilayered film a shield type MR head, the nonmagnetic intermediate layer has the thickness thereof is set that an antiferromagnetic coupling force may be generated between the adjacent ferromagnetic layers, in order to obtain a read back signal when a signal field is applied in the same direction to each magnetic layer. In the present embodiment, the GMR nonmagnetic intermediate layer 5 has the thickness thereof set at 3 nm, for example, for the purpose of generating a ferromagnetic coupling force between the first and the second GMR ferromagnetic layer 4a and 4b. Owing to this ferromagnetic coupling force, the magnetizations of the first and the second GMR ferromagnetic layers 4a and 4b are arranged in substantially equal direction with the signal magnetic field in a state of zero.

For the first and the second signal magnetic field detecting ferromagnetic layer 3a and 3b, it is desirable to use amorphous films such as a CoZrNb film and a CoFeBc film, microcrystalline nitride films such as a FeZrN film and a FeTaN film, microcrystalline carbide films such as a FeTaC film and a FeZrC film, and alloy films such as a Fe—SiO heteroamorphous film and a NiFeX (wherein X stands for such metallic elements as Nb, Cr, Ta, Zr, Rh, Pd, Ru, Mo, and Cu). These films possess higher permeability than the GMR ferromagnetic layers 4a and 4b mentioned above and, at the same time, possess high resistance exceeding 100 $\mu\Omega$cm, for example, which is enough to prevent the degradation of sensitivity by the partial sense current flow to the signal magnetic field detecting ferromagnetic layers 3a and 3b.

Though the thickness of the signal magnetic field detecting ferromagnetic layers 3a and 3b is not particularly limited, it is desired to be greater than that of the GMR ferromagnetic layers 4a and 4b. Owing to the greater thickness, the detection of signal magnetic fields is facilitated because the magnetic effects which the exchange coupling thereof with the GMR ferromagnetic layers 4a and 4b manifests as in degrading permeability are alleviated. Specifically, the signal magnetic field detecting ferromagnetic layers 3a and 3 are desired to have a thickness in the approximate range of from 5 to 100 nm. If the signal magnetic field detecting ferromagnetic layers 3a and 3b have an unduly small thickness, the rotation of the magnetizations of the GMR ferromagnetic layers 4a and 4b in response to the rotation of the magnetizations of the signal magnetic field detecting ferromagnetic layers 3a and 3b will be attained with difficulty. If they have a small thickness unduly instead, the permeability will tend to decrease and the partial diversion of the shunt current into the signal magnetic field detecting ferromagnetic layers 3a and 3b will increase. The signal magnetic field detecting ferromagnetic layers 3a and 3b are specifically formed of a CoZrNb film, a CoFeBC film, a FeZrN film, a FeTaN film, a FeTaC film, a FeZrC film, a Fe—SiO heteroamorphous film, or a NiFeX film which has a thickness of about 20 nm.

Then, the laminated structure consisting of the first GMR ferromagnetic layer 4a, the GMR nonmagnetic intermediate layer 5, and the second GMR ferromagnetic layer 4b and constituting itself the GMR element 7 is formed of materials having lower wear resistance than the first and the second signal magnetic field detecting ferromagnetic layers 3a and 3b. As a result, the GMR element part 7 is made by polishing to recede from the opposed surface of the medium. The signal magnetic fields which are directly sensed by the GMR element part 7 grow weak and the gap length can be regulated more precisely by the thickness of the GMR element part 7. The recession of the GMR element part 7 from the opposed surface of the medium may be effected by selectively corroding the GMR element part 7 by reactive ion etching or chemical dry etching, for example.

In the differential detection type MR head 1 of the structure mentioned above, the first and the second GMR ferromagnetic layers 4a and 4b do not have the magnetizations thereof rotated directly by signal magnetic fields. As the first and the second signal magnetic field detecting ferromagnetic layers 3a and 3b have the magnetizations thereof rotated by signal magnetic fields, the magnetizations of the first and the second GMR ferromagnetic layers 4a and 4b are rotated by the magnetic coupling across the interfaces in response to the rotation of the layers 3a and 3b. As a result, the GMR element part 7 is made equal to a substantial gap. The gap of a length (of the order of 10 to 100 nm, for example) fit for the linear recording density, therefore, can be formed. The gap length of the differential detection type MR head 1 of the present embodiment is about 23 nm.

In the case of a perpendicular magnetic recording medium, for example, when the gap mentioned above is positioned as separated from the magnetization transition region of a magnetic recording medium 9 and signal magnetic fields of equal directions are applied to the first and the second signal magnetic field detecting ferromagnetic layers 3a and 3b, the magnetizations of these layers 3a and 3b are rotated in mutually equal directions and the angle formed by the magnetizations of the first and the second GMR ferromagnetic layers 4a and 4b is not varied after all. Consequently, no substantial variation of resistance occurs in the GMR element part 7. When the gap exists directly above the magnetization transition region of the magnetic recording medium 9 and signal magnetic fields of mutual opposite directions are applied to the first and the second signal magnetic field detecting ferromagnetic layers 3a and 3b instead, the magnetizations of these layers 3a and 3b are rotated in opposite directions and the angle formed by the magnetizations of the first and the second GMR ferromagnetic layers 4a and 4b is varied toward the antiparallel arrangement of magnetizations. As a result, the resistance of the GMR element part 7 is varied largely and the detection of recorded information is attained.

In that way, the differential detection type MR head 1 of the embodiment cited the functions as a read head for displaying a differential detection type output response in the magnetization transition region of the magnetic recording medium 9. Unlike the differential detection type MR head using the conventional AMR element, this MR head 1 produces a differential detection by utilizing the resistance which varies proportionately to the angle formed by the magnetizations of the first and the second GMR ferromagnetic layers 4a and 4b and consequently realizes the reading with high sensitivity and high S/N ratio which has never been accomplished by the conventional AMR element. Further, the detection of signals is stabilized because the magnetizations of the first and the second GMR ferromagnetic layers 4a and 4b occur in substantially equal direction with the signal magnetic fields in a state of zero. The differential detection type MR head 1 of the first embodiment, therefore, is a read head which realizes, by the use of a very simple head structure, the adjustment of the gap length to the length of the magnetization transition region of the magnetic recording medium 9 and the of high read sensitivity.

Then, In the GMR head using a spin valve structure, the magnetization of either of the GMR ferromagnetic layers is fixed by an antiferromagnetic layer. For this antiferromagnetic layer, generally, a FeMn antiferromagnetic layer which is capable of imparting a large bias magnetic field enough to maintain stably the magnetization in the fixed state in spite of an application of signal magnetic field is used. Since this FeMn antiferromagnetic layer is susceptible of corrosion, however, it forms a cause for degrading the durability of the MR head. In contrast thereto, the differential detection type MR head 1 mentioned above excels in durability because it has no use for the FeMn antiferromagnetic layer.

Figure 2:
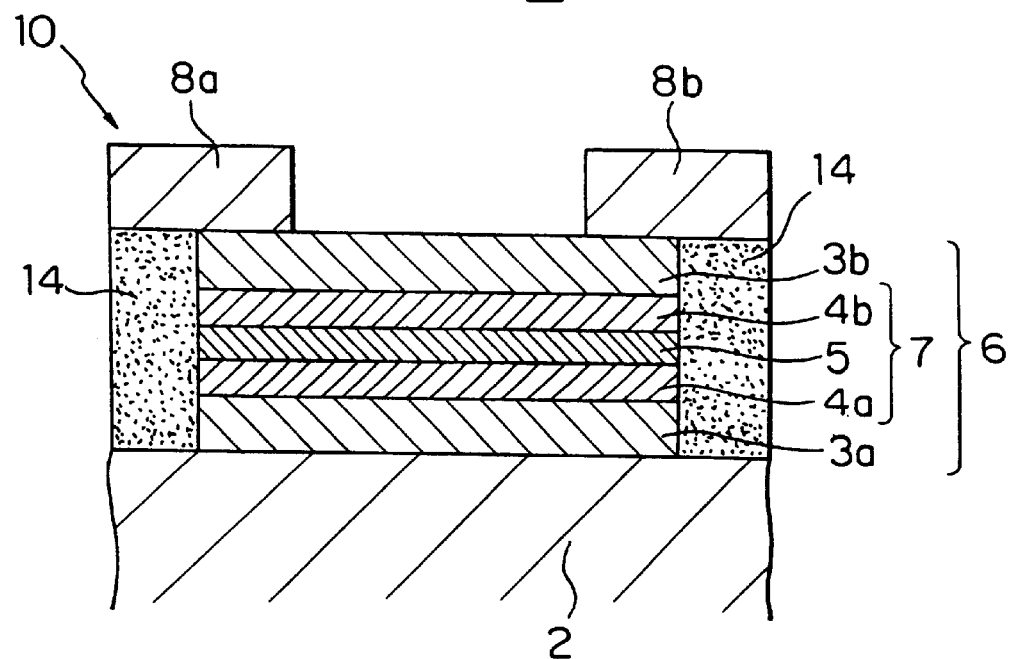
FIG. 2 is a cross section illustrating one example of the modification of the differential detection type MR head shown in FIG. 1 by the incorporation of a bias film therein.
Figure 3:
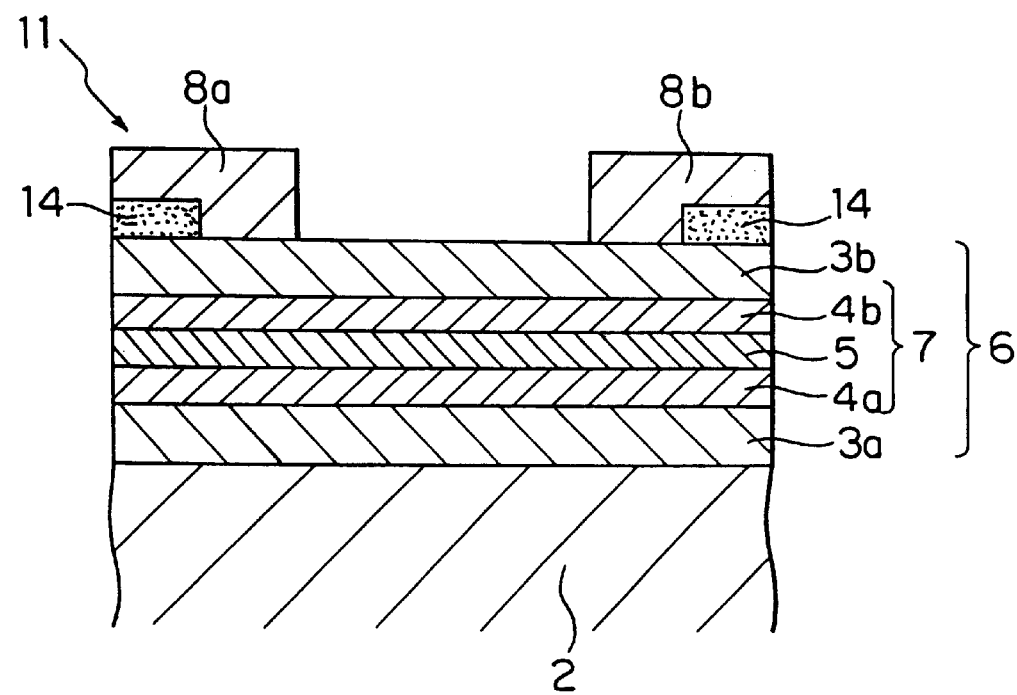
FIG. 3 is a cross section illustrating another example of the modification of the differential detection type MR head shown in FIG. 1 by the incorporation of a bias film therein.
Figure 4:
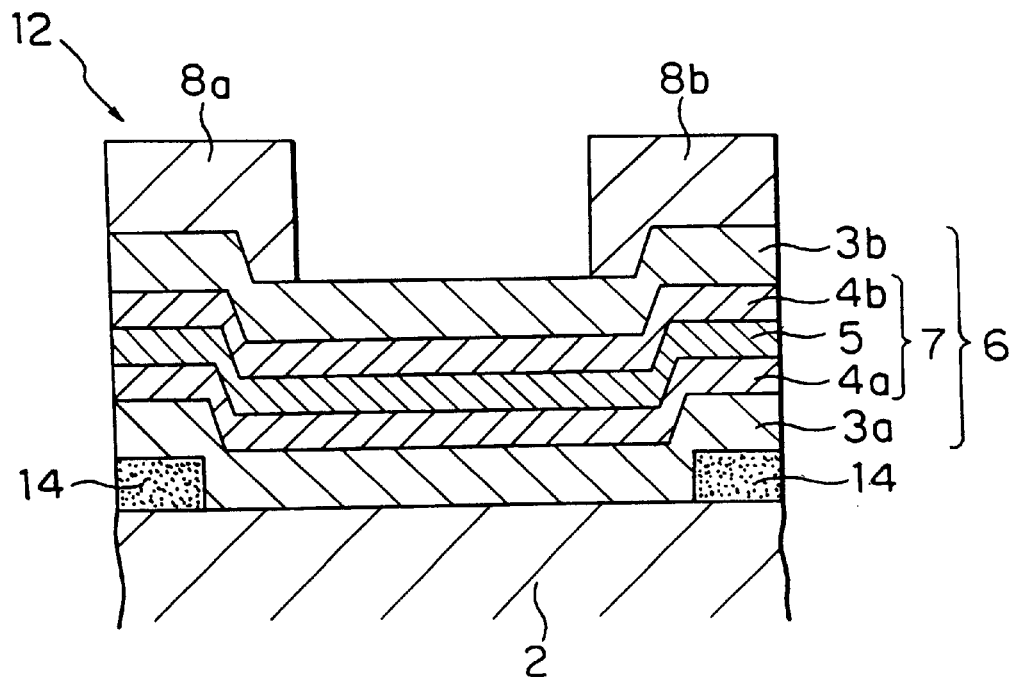
FIG. 4 is a cross section illustrating yet another example of the modification of the differential detection type MR head shown in FIG. 1 by the incorporation of a bias film therein.
Figure 5:
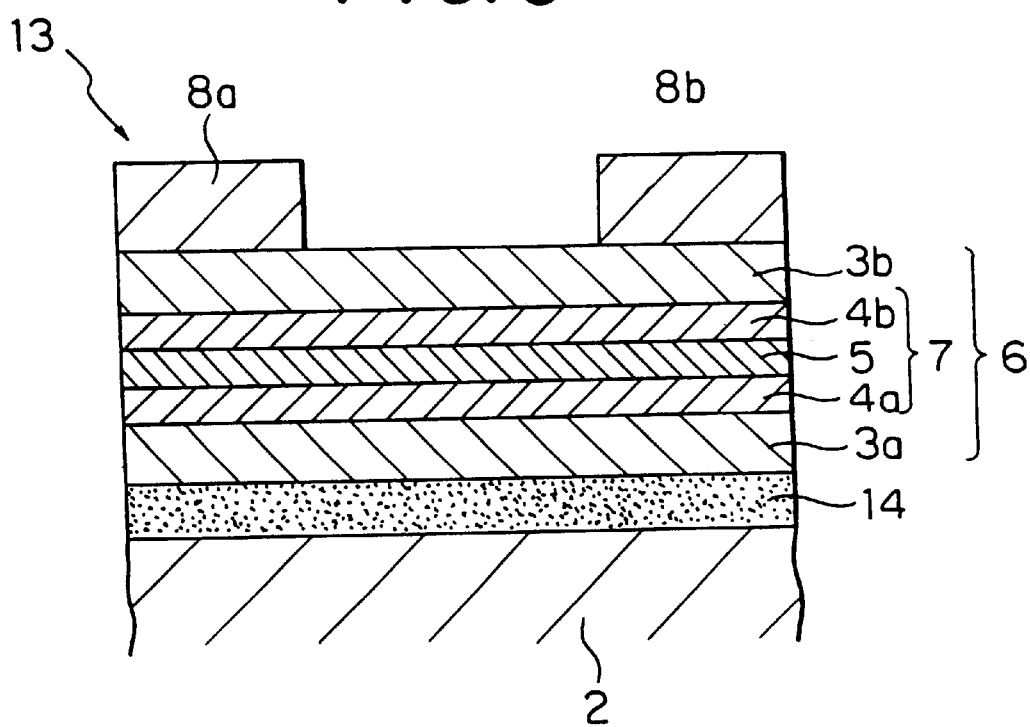
FIG. 5 is a cross section illustrating still another example of the modification of the differential detection type MR head shown in FIG. 1 by the incorporation of a bias film therein.

FIG. 2 through FIG. 5 are diagrams severally illustrating the constructions of examples of the modification of the first embodiment mentioned above. Differential detection type MR heads 10, 11, 12, and 13 shown therein are invariably adapted to apply a bias magnetic field to the differential detection type MR elements 6 of their own. FIG. 2, for example, depicts a construction having bias films 14 attached one each to the opposite ends in the direction of track width of the differential detection type MR element 6. Then, FIG. 3 depicts a construction having bias films 14 superposed on the opposite ends in the direction of track width of the differential detection type MR element 6. FIG. 4 depicts a construction having bias films 14 interposed between the substrate 2 and the MR element 6 below the opposite ends in the direction of track width of the differential detection type MR element 6. FIG. 5 depicts a construction having the differential detection type MR element 6 underlaid with a bias film 14.

The bias film 14 is formed of a hard ferromagnetic film such as, for example, a CoPt film or an antiferromagnetic film such as, for example, a FeMn film or a NiO film. The differential detection type MR heads 10, 11, 12, and 13 enable the magnetizations of the first and the second GMR ferromagnetic layers 4a and 4b to be infallibly arranged in substantially equal directions with signal magnetic fields in a state of zero. They are further allowed to repress Barkhausen noise by depriving the respective ferromagnetic layers 3a, 3b, 4a, and 4b of a domain wall. Only the differential detection type MR head 13 shown in FIG. 5 is desired to have a nonmagnetic layer interposed between the ferromagnetic layer 3a and the bias film 14 when the bias wall 14 is formed of a hard ferromagnetic film.

Next, the second embodiment of this invention will be described below with reference to FIG. 6.

Figure 6:
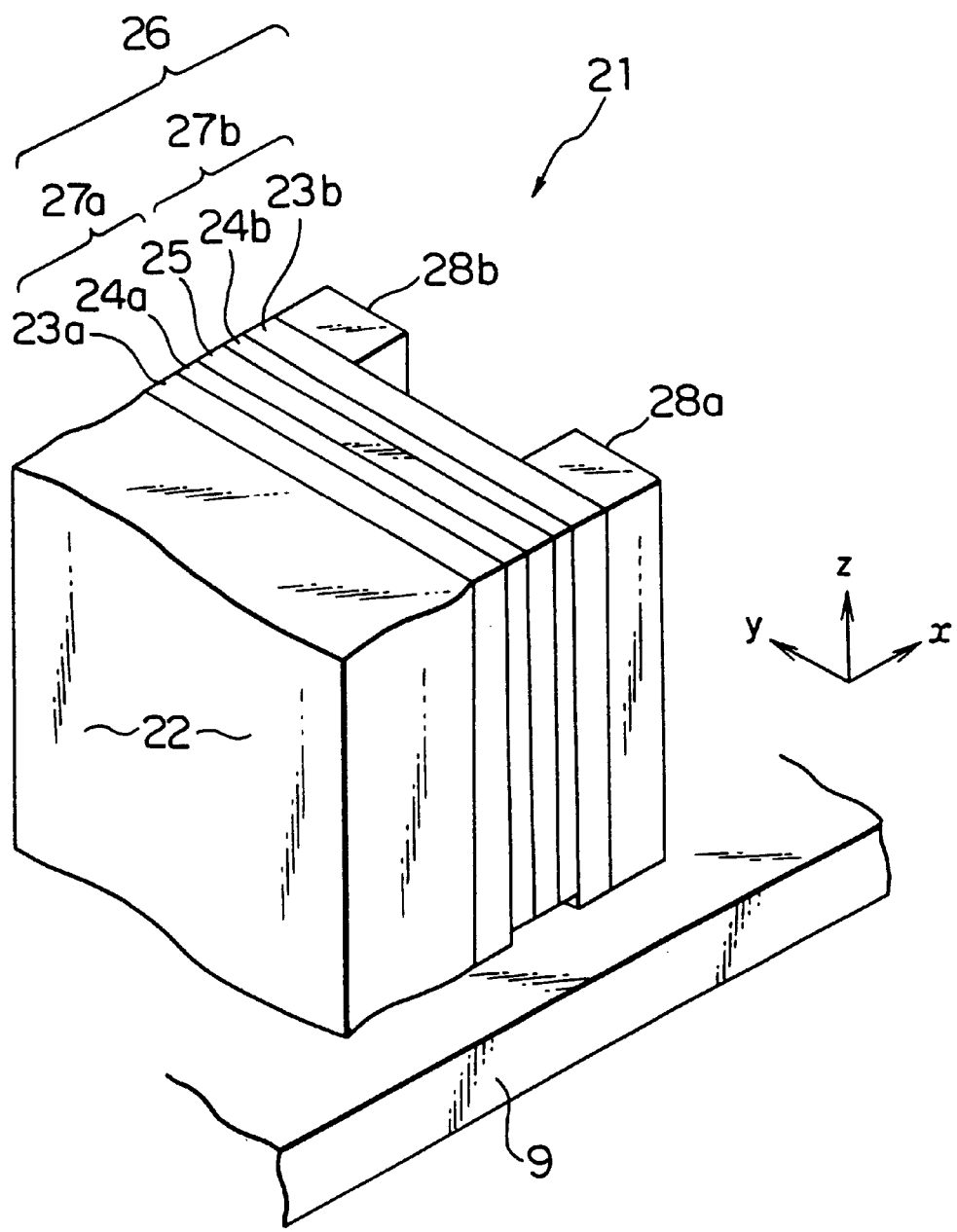
FIG. 6 is a perspective view illustrating the essential construction of a differential detection type MR head as the second embodiment of this invention.

In a differential detection type MR head 21 shown in FIG. 6, a first GMR ferromagnetic layer 23a adapted to have the magnetization thereof rotated by a signal magnetic field, a first GMR nonmagnetic intermediate layer 24a, a low-permeability ferromagnetic layer 25 not allowing substantial variation of the magnetization thereof by a signal magnetic field, a second GMR nonmagnetic intermediate layer 24b, and a second GMR ferromagnetic layer 23b adapted to have the magnetization thereof rotated by a signal magnetic field similarly to the first GMR ferromagnetic layer 23a are sequentially superposed on a substrate 22. The laminated structure thus produced constitutes itself a GMR element part 26.

In this structure, the first GMR ferromagnetic layer 23a, the first GMR nonmagnetic intermediate layer 24a, and the low-permeability ferromagnetic layer 25 jointly form a first GMR unit 27a and the low-permeability ferromagnetic layer 25, the second GMR nonmagnetic intermediate layer 24b, and the second GMR ferromagnetic layer jointly form a second GMR unit 27b. In addition, electrodes 27a and 27b for supplying a sense current in the direction of track width (the direction of y in the diagram) are formed one each at the opposite ends of the GMR element part 26. Thus, the differential detection type MR head 21 is constructed.

For the first and the second GMR ferromagnetic layers 23a and 23b, it is desirable to use a NiFe alloy film, a CoFe alloy film, a CoFeNi alloy film and the like which excel in the spin-dependent scatting ability. The GMR ferromagnetic layers 23a and 23b are desired to have a thickness in the approximate range of from 2 to 20 nm for the sake of acquiring a large ratio of variation of the resistance. Then, for the first and the second GMR nonmagnetic intermediate layers 24a and 24b, it is desirable to use a Cu film, a Au film, a Ag film, and films of alloys formed mainly of these metals which have low resistance fit for the spin-dependent scattering. The GMR nonmagnetic intermediate layers 24a and 24b are desired to have a thickness in the approximate range of from 1 to 10 nm for the sake of acquiring a large ratio of variation of the resistance. In the second embodiment, a NiFe alloy film, a CoFe alloy film, or a CoFeNi alloy film having a thickness of 8 nm is used for the first and the second GMR ferromagnetic layers 23a and 23b and a Cu film, a Au film, a Ag film, a film of an alloy of such a metal and the like, having a thickness of 3 nm is used for the first and the second GMR nonmagnetic intermediate layer 24a and 24b.

For the low-permeability ferromagnetic layer 25, a ferromagnetic material such as Co or a Co type alloy such as CoPt which excels in the spin-dependent scattering ability and allows impartation of high coercive force and large uniaxial magnetic anisotropy can be used. This layer 25 is desired to have a thickness in the approximate range of from 1 to 40 nm for the sake of acquiring a large ratio of variation of the resistance. In the present embodiment, the low-permeability ferromagnetic layer 25 is formed of a CoPt film which has a thickness of 20 nm and a coercive force of 20 kA/m (permeability =10). If an antiferromagnetic film rich in resistance and deficient in the spin-dependent scattering ability is used in the place of the low-permeability ferromagnetic layer 25 in this case, the ratio of variation of the resistance is degraded markedly because this film shatters the spin information of the GMR element part 26. When the low-permeability ferromagnetic layer 25 is formed of Co or CoPt, it allows a large ratio of variation of the resistance.

Figure 7:
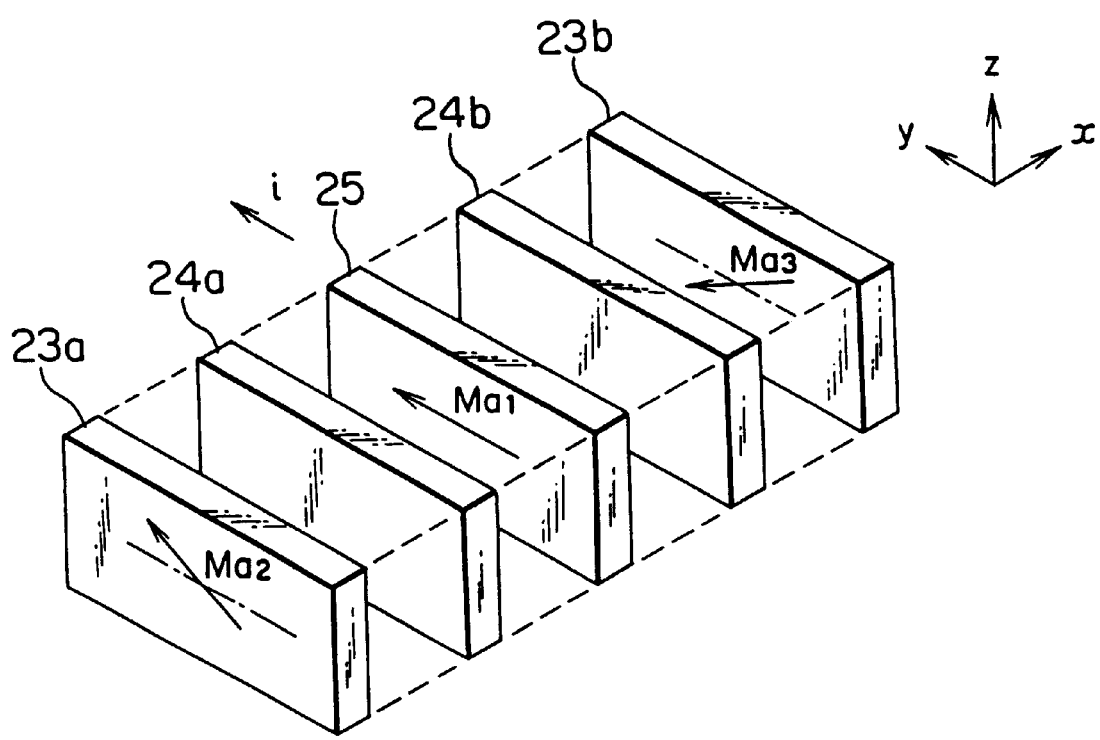
FIG. 7 is a diagram illustrating the state of magnetization of the differential detection type MR head shown in FIG. 6 with the signal magnetic field in a state of zero.

The direction of the magnetization $M_{a1}$ of the low-permeability substantially coincides with the direction of track width as shown in FIG. 7 irrespectively of the presence or the absence of a signal magnetic field. Further, the direction of the magnetization $M_{a1}$ of the low-permeability ferromagnetic layer 25 is stabilized substantially to resist a signal magnetic field when the layer 25 is endowed with heightened coercive force or increased uniaxial magnetic anisotropy. The magnetizations $M_{a2}$ and $M_{a3}$ respectively of the first and the second GMR ferromagnetic layers 23a and 23b have their directions rotated by a magnetic field which is generated by a sense current while the signal magnetic field is substantially in a state of zero. Specifically, this rotation occurs in the plus z direction in the case of the first GMR ferromagnetic layer 23a and in the minus z direction in the case of the second GMR ferromagnetic layer 23b.

When signal magnetic fields of equal directions such as, for example, the plus z directions flow into the first and the second GMR ferromagnetic layers 23a and 23b, the resistance increases in the first GMR unit 27a because the angle formed by the magnetizations $M_{a2}$ and the magnetizations $M_{a1}$ increases. The resistance in the second GMR unit 27b decreases because the angle formed by the magnetizations $M_{a2}$ and the magnetizations $M_{a1}$ conversely decreases. The overall resistance in the GMR element part 26, therefore, is not varied.

When signal magnetic fields of opposite directions flow into the first and the second GMR ferromagnetic layers 23a and 23b, the resistance in the first GMR unit 27a and that in the second GMR unit 27b both increase or decrease because the angle formed by the magnetization $M_{a2}$ and the magnetization $M_{a1}$ and the angle formed by the magnetization $M_{a3}$ and the magnetization $M_{a1}$ both increase or decrease. As a result, the resistance of the GMR element part 26 is largely varied. The detection of a signal by the differential detection, therefore, is attained because the resistance of the GMR element part 26 is amply varied by a signal magnetic field only when signal magnetic fields of opposite directions are applied to the first and the second GMR element part 26.

For the sake of enlarging the linear response region with the differential detection of the nature above-described, it is desirable to set the angles of rotation of the magnetizations $M_{a2}$ and the magnetization $M_{a3}$ produced by the sense current at about +45° and about −45° respectively from the direction of track width (the y direction in the diagram). This setting of the angles can be accomplished by suitably selecting the magnitude of the sense current, the thicknesses of the component layers 23a, 23b, 24a, 24b, and 25, the magnitude of resistivity, and other factors.

The differential detection type MR head 21 of the embodiment described above functions as a read head which exhibits a defferential detection type output response in the magnetization transition region of the magnetic recording medium 9 as described above. Unlike the defferential detection type MR head using the conventional AMR element, this MR head 21 produces a differential detection by utilizing the resistance which varies proportionately to the angle formed by the magnetizations of the first and the second GMR unit 27a and 27b and consequently realizes the reading with high sensitivity and high S/N ratio which has never been accomplished by the conventional AMR element. Further, the differential detection type MR head 21 can regulate the gap to a length fit for the magnetization transition region of the magnetic recording medium 9 with the interval between the two GMR ferromagnetic layers 23a and 23b.

In order for the differential detection type MR head 21 of the construction described above to accomplish the detection of a signal stably at a high S/N ratio by the differential detection, it is important that the magnetization $M_{a1}$ of the low-permeability ferromagnetic layer 25 will be prevented from being varied by a signal magnetic field without causing the spin-dependent scattering ability to be degraded. By the adoption of at least one of the structures (a) through (c) shown below, the magnetization $M_{a1}$ of the low-permeability ferromagnetic layer 25 can be stabilized.

(a) The component layers 23a, 23b, 24a, 24b, and 25 of the GMR element part 26 have their depths (the widths in the z direction in the diagram) finally adjusted by a polishing to be given from the opposed surface side of the medium. Soft magnetic films of high hardness enough to defy the polishing are disposed one each outside the first and the second GMR ferromagnetic layers 23a and 23b. Owing to this arrangement, at least the low-permeability ferromagnetic layer 25 is caused to recede from the opposed surface of the medium. As a result, the magnetization $M_{a1}$ gains in stability because the intensity of the signal magnetic field applied to the low-permeability ferromagnetic layer 25 is consequently weakened. When the structure of this kind is adopted, a ferromagnetic material which excels in the spin-dependent scattering ability is used as described above for the low-permeability ferromagnetic layer 25. As concrete examples of the soft magnetic film of high hardness mentioned above, the Fe type and the Co type nitride films and the Co type amorphous films may be cited. The soft magnetic layer is desired to have a thickness in the approximate range of from 1 to 50 nm.

The decrease of the sensitivity due to the recession of the low-permeability ferromagnetic layer 25 in this case is slight because the soft magnetic film of high hardness mentioned above enables a necessary signal magnetic field to be drawn to the GMR element part 26, though more or less weakly as compared with the vicinity of the medium. If the soft magnetic film of high hardness has unduly low resistance, however, the ratio of variation of the resistance will possibly be lowered because the sense current flows into the soft magnetic film. It is, therefore, desirable to use for the soft magnetic film of high hardness a film having higher resistivity than the GMR ferromagnetic layers 23a and 23b.

The aforementioned recession of the low-permeability ferromagnetic film 25 from the opposed surface of the medium can be equally accomplished by selectively etching the low-permeability ferromagnetic layer 25. The dry etching such as, for example, the so-called CDE may be utilized for the purpose of this selective etching.

(b) Generally, more often than not a film of high coercive force and a ferromagnetic film having large magnetic anisotropy have no fully satisfactory spin-dependent scattering ability. To correct this defect, ferromagnetic films excelling in the spin-dependent scattering ability are interposed one each between the low-permeability ferromagnetic layer 25 and the first and the second GMR nonmagnetic intermediate layers 24a and 24b. owing to the adoption of this structure, the coercive force and the magnetic anisotropy of the low-permeability ferromagnetic layer 25 can be augmented without a sacrifice of the high ratio of variation of the resistance. Specifically, the low-permeability ferromagnetic layer 25 is formed of such a hard ferromagnetic film as a CoNiTa alloy film or a CoPtCr alloy film which does not possess a very high spin-dependent scattering ability and measures about 20 nm in thickness and Co films which excel particularly in the spin-dependent scattering ability and have a thickness in the approximate range of from 1.5 to 5 nm are interposed one each in the interfaces between the low-permeability ferromagnetic film 25 and the first and the second GMR nonmagnetic intermediate layers 24a and 24b.

(c) The low-permeability ferromagnetic layer 25 is formed of an artificial lattice film which is produced by alternately superposing ferromagnetic films and nonmagnetic films and consequently enabled to generate an antiferromagnetic coupling between the adjacent ferromagnetic films across the nonmagnetic films. The artificial lattice film mentioned above is desired to have the magnitude of the antiferromagnetic coupling so controlled as to surpass the saturated magnetic field. As a concrete structure of the artificial lattice film, the film obtained by alternately superposing Co films of a thickness in the approximate range of from 0.5 to 5 nm and Cu films or Ru films of a thickness in the approximate range of from 0.5 to 5 nm may be cited. Also by this structure, the stability of the direction of the magnetization of the low-permeability ferromagnetic layer 25 relative to the signal magnetic field can be heightened.

By adopting the structures (a) through (c) above-described, the read back signals with a high S/N ratio by a further stabilized differential detection can be realized.

Next, the third embodiment of this invention will be described below with reference to FIG. 8.

Figure 8:
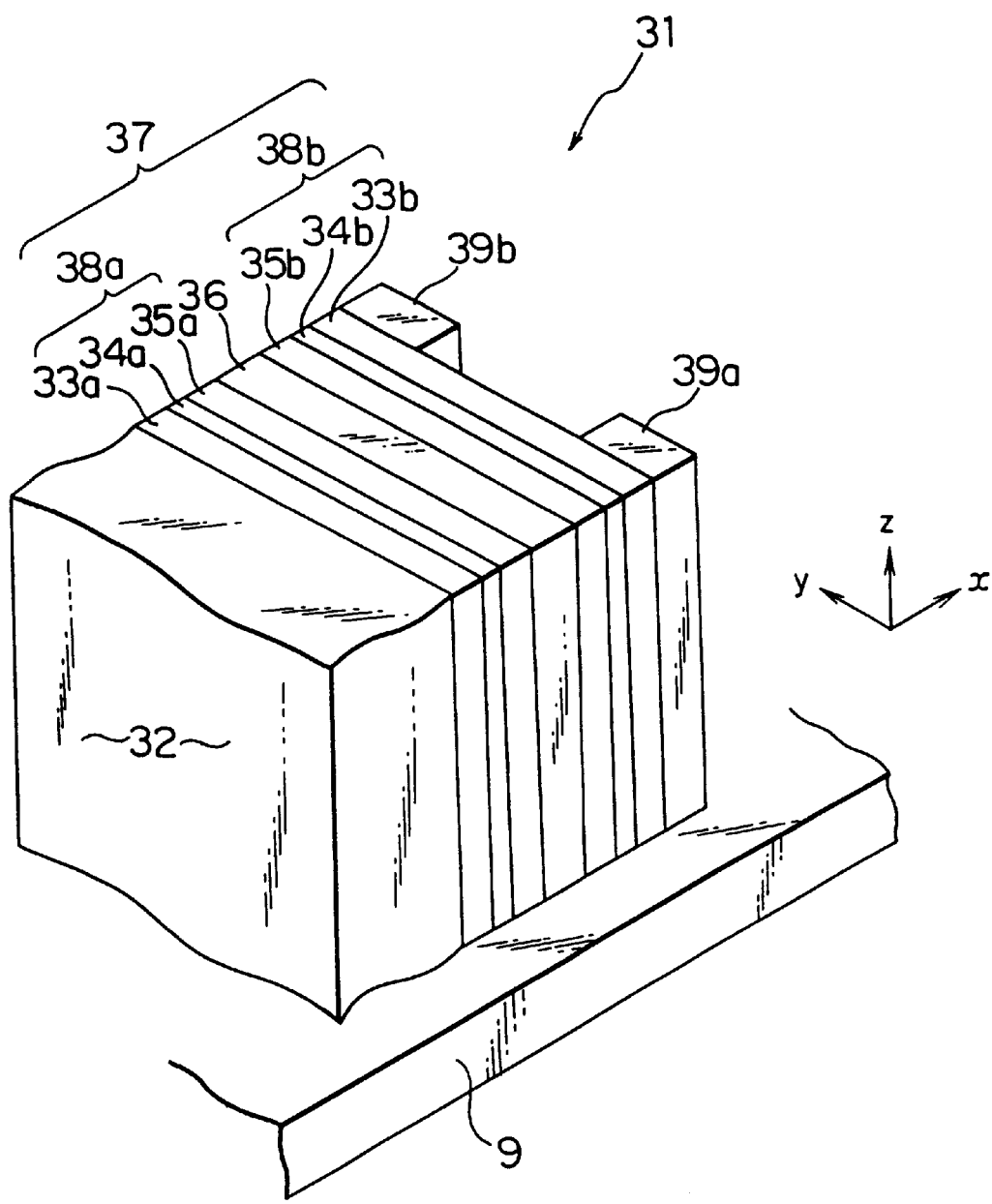
FIG. 8 is a perspective view illustrating the essential construction of a differential detection type MR head as the third embodiment of this invention.
Figure 9:
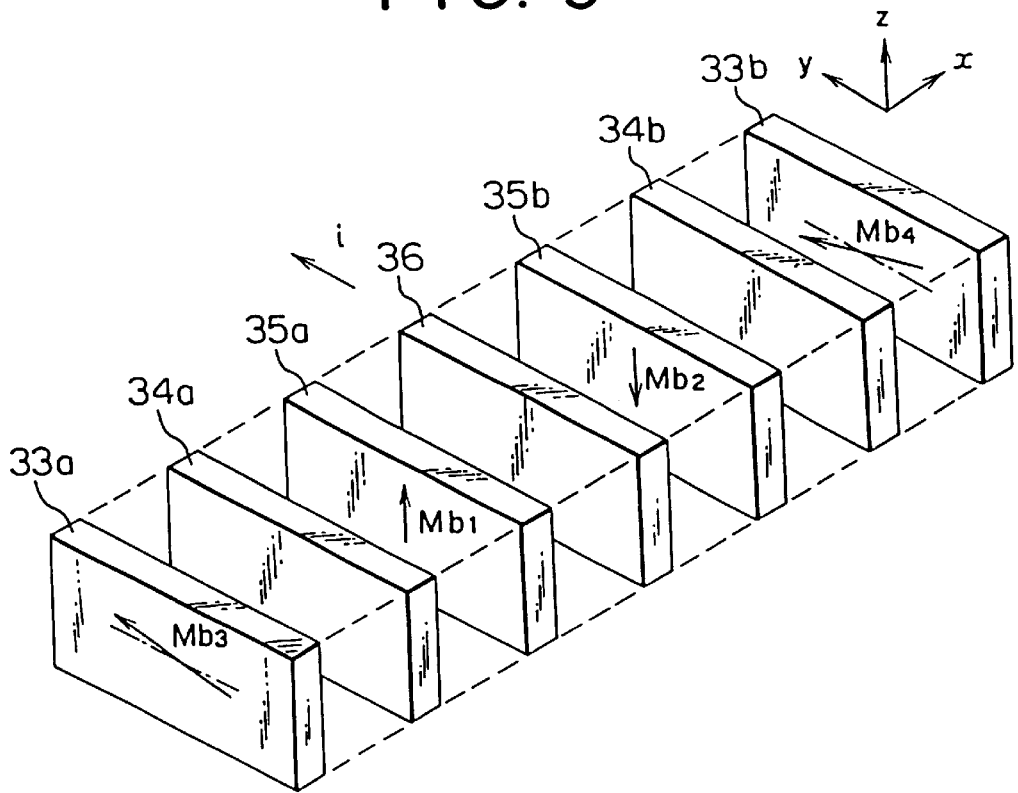
FIG. 9 is a diagram illustrating the state of magnetization of the differential detection type MR head shown in FIG. 8 with the signal magnetic field in a state of zero.

In a differential detection type MR head 31 shown in FIG. 8, a first GMR ferromagnetic layer 33a adapted to have the magnetization thereof rotated by a signal magnetic field, a first GMR nonmagnetic intermediate layer 34a, a first low-permeability ferromagnetic layer 35a adapted to have the direction of the magnetization thereof not substantially varied by a signal magnetic field, a separating nonmagnetic intermediate layer 36 adapted to weaken a ferromagnetic coupling between adjacent ferromagnetic layers 35a and 35b, a second low-permeability ferromagnetic layer 35b, a second GMR nonmagnetic intermediate layer 34b, and a second GMR ferromagnetic layer 33b are sequentially superposed in the order mentioned on a substrate 32. The laminated structure consequently obtained constitutes itself a GMR element part 7.

The first GMR ferromagnetic layer 33a, the first GMR nonmagnetic intermediate layer 34a, and the first low-permeability ferromagnetic layer 35a jointly form a first GMR unit 38a and the second low-permeability ferromagnetic layer 35b, the second GMR nonmagnetic intermediate layer 34b, and the second GMR ferromagnetic layer 33b jointly form a second GMR unit 38b. Further, electrodes 39a and 39b for supplying a sense current in the direction of track width (the y direction in the diagram) are formed one each at the opposite ends of a GMR element part 37. Of these components, the differential detection type MR head 31 is composed.

For the first and the second GMR ferromagnetic layers 33a and 33b and the first and the second GMR nonmagnetic intermediate layers 34a and 34b, the same materials and the same thicknesses as mentioned above with respect to the second embodiment may be adopted. Likewise for the first and the second low-permeability ferromagnetic layers 35a and 35b, the same material and the same thickness as mentioned above with respect of the low-permeability ferromagnetic layer of the second embodiment can be adopted.

For the separating nonmagnetic intermediate layer 36, it is desirable to use a nonmagnetic film adapted especially for the spin-dependent scattering similarly to the first and the second GMR nonmagnetic intermediate layer 34a and 34b for the purpose of obtaining a large ratio of variation of the resistance without disrupting the spin information. For this film, such low resistance as fits the spin-dependent scattering is not always necessary. It is desirable to use such a nonmagnetic film as markedly weakens the ferromagnetic coupling between the first and the second low-permeability ferromagnetic layers 35a and 35b. When the dominant consideration resides in weakening the ferromagnetic coupling between the ferromagnetic layers 35a and 35b, therefore, the separating nonmagnetic layer 36 may be formed of such a nonmagnetic insulating film as a $SiO_2$ film or an $Al_{23}$ film, for example. In cases where the separating nonmagnetic intermediate layer 36 is desired to have an increased thickness for the sake of adjusting the gap length, the degradation of the ratio of variation of the resistance due to the partial diversion of the sense current to the separating nonmagnetic intermediate layer 36 can be prevented by the adoption of the nonmagnetic insulating film. Further, since the separating nonmagnetic intermediate layer 36 is destined to serve as a foundation for the low-permeability ferromagnetic layer 35b, such a nonmagnetic metallic film as a Cr film or a Ta film which is adapted for the impartation of high coercive force and high uniaxial magnetic anisotropy to the low-permeability ferromagnetic layer 35b may be used. The thickness of the separating nonmagnetic intermediate layer 36 may be suitably set in consideration of the material to be selected. For the adjustment of the gap length, the thickness is desired to be in the approximate range of from 0.5 to 100 nm.

In cases where the differential detection type MR head 31 does not particularly call for a high recording density, the gap length, when enlarged, brings about the advantage of improving the read sensitivity because the signal magnetic field is extended throughout the entire volume of the GMR element part 37. When the separating nonmagnetic intermediate layer 36 has low resistivity, however, the sense current tends to flow readily to the intermediate layer 36 and, meanwhile, the read sensitivity declines. When the thickness of the separating nonmagnetic intermediate layer 36 is to be increased, therefore, it is desirable to form the separating nonmagnetic intermediate layer 36 with a material having high resistivity.

The magnetization $M_{b1}$ of the first low-permeability ferromagnetic layer 35a extends in the direction perpendicular (the plus z direction in the diagram) to the opposed surface of the medium. In contrast thereto, the magnetization $M_{b2}$ of the second low-permeability ferromagnetic layer 35b extends in the direction differing by 180° (the minus z direction in the diagram) from that of the first low-permeability ferromagnetic layer 35a. The magnetizations in the directions differing by 180° as described above can be realized as follows.

First, the coercive forces $H_{c1}$ and $H_{c2}$ of the two low-permeability ferromagnetic layers 35a and 35b are differentiated as by varying the film-forming conditions or superposing the films on different foundations. Incidentally, in the present embodiment, since the low-permeability ferromagnetic layer 35a superposed on the nonmagnetic layer 34a acquires high coercive force with difficulty, the relation $H_{c1}<H_{c2}$ inevitably arises. Then, the magnetization is effected by application of a magnetic field greater than the coercive force $H_{c2}$, the magnetic field is nulled, and the magnetization is again effected by application of a magnetic field intermediate between $H_{c1}$ and $H_{c2}$ in the opposite direction. Particularly by using for the separating nonmagnetic intermediate layer 36 a Cr film or a Ta film which is adapted for the impartation of high coercive force and high uniaxial magnetic anisotropy to the second low-permeability ferromagnetic layer 35b as described above, the second low-permeability ferromagnetic layer 35b is easily allowed to acquire large coercive force as compared with the first low-permeability ferromagnetic layer 35a on the GMR nonmagnetic intermediate layer 34a.

Figure 10:
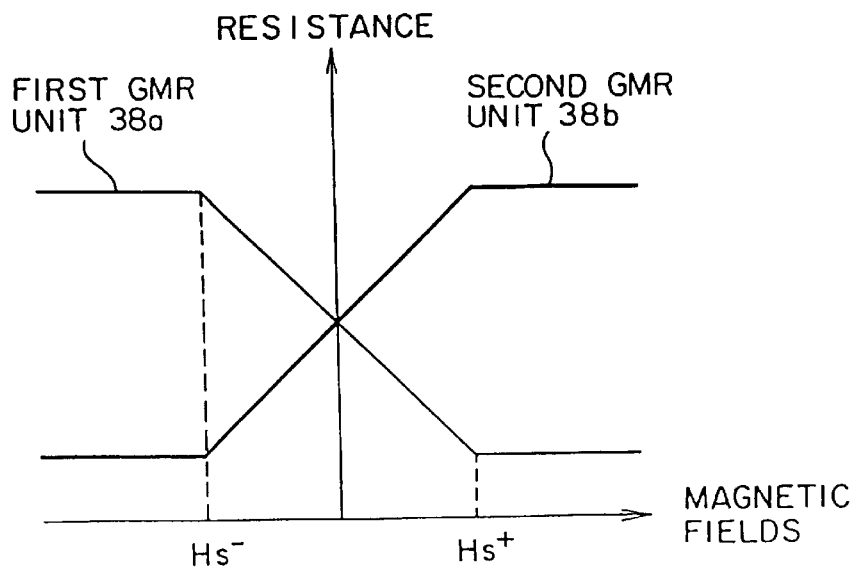
FIG. 10 is a diagram illustrating variations of resistance by a signal magnetic field of the differential detection type MR head shown in FIG. 8.

When the first and the second low-permeability ferromagnetic layers 35a and 35b are magnetized as described above, they are at an advantage in acquiring further enhanced stability to resist a signal magnetic field because they are each made to generate a magnetostatically coupling magnetic field in the direction of intensifying the direction of magnetization. In addition, when the first and the second low-permeability ferromagnetic layer 35a and 35b are magnetized respectively in the plus z direction and the minus z direction, the magnetizations $M_{bs}$ and $M_{b4}$ of the first and the second GMR ferromagnetic layers 33a and 33b are rotated in the plus z direction or the minus z direction from the direction of track width, depending on the relevant signal magnetic fields, with the result that the resistance is linearly varied as shown in FIG. 10 in conformity with the rotation. In FIG. 10, the symbol $H_s^+$ represents the magnetic field for causing the magnetization to be extended in the plus z direction and the symbol $H_{s-}$ represents the magnetic field for causing the magnetization to be extended in the minus z direction.

As a result, the linear variation of the resistance is obtained and the detection of a signal of minor distortion and a high S/N ratio is accomplished without requiring the magnetizations $M_{b3}$ and $M_{b4}$ of the first and the second GMR ferromagnetic layer 33a and 33b to be rotated substantially in the ±45° directions by the sense current. In other words, for the purpose of obtaining a wide range of linear response, it is desirable to turn the magnetizations $M_{b3}$ and $M_{b4}$ of the first and the second GMR ferromagnetic layer 33a and 33b substantially in the direction of track width (the y direction in the diagram) with the signal magnetic fields in a state of zero by utilizing the form magnetic anisotropy and the induced magnetization anisotropy formed by the film formation in the magnetic field and/or applying a bias field to the track width direction as is shown in FIGS. 2 to 5.

According to the structure described above, when signal magnetic fields of equal directions such as, for example, the plus z directions are applied to the first and the second GMR ferromagnetic layer 33a and 33b, the resistance decreases in the first GMR unit 38a because the magnetizations of the first GMR ferromagnetic layer 33a and the first low-permeability ferromagnetic layer 35a are ferromagnetically arranged as clearly noted from FIG. 10. The resistance conversely increases in the second GMR unit 38b because the magnetizations of the second GMR ferromagnetic layer 33b and the second low-permeability ferromagnetic layer 35b are antiferromagnetically arranged. The variations of the resistance by the two GMR units 38a and 38b, therefore, are offset and the overall resistance of the GMR element part 37 as a whole is not varied.

When signal magnetic fields of opposite directions are applied to the first and the second GMR ferromagnetic layers 33a and 33b, specifically a signal magnetic field of the plus z direction to the first GMR ferromagnetic layer 33a and a signal magnetic field of the minus z direction to the second GMR ferromagnetic layer 33b, the resistance in the first GMR unit 38a decreases because the magnetizations of the first GMR ferromagnetic layer 33a and the first low-permeability ferromagnetic layer 35a are arranged ferromagnetically and the resistance in the second GMR unit 38b likewise decreases because the magnetizations of the second GMR ferromagnetic layer 33b and the second low-permeability ferromagnetic layer 35b are arranged ferromagnetically. As a result, the differential detection type detection of magnetic fields is attained because the overall resistance of the GMR element part 37 is amply varied.

The differential detection type MR head 31 of the third embodiment described thus far functions as a read head which displays a differential detection type output response in the magnetization transition region of the magnetic recording medium 9 as described above. This differential detection type MR head 31, like the differential detection type MR head 21 of the second embodiment described previously, produces the differential detection by utilizing the resistance which varies proportionately to the angle formed by the magnetizations in the first and the second GMR unit 38a and 38b and, therefore, realizes the reading with high sensitivity and a high S/N ratio which has never been attained by the conventional AMR element. Further, in the differential detection type MR head 31, the gap length finely adapted for the linear recording density can be set because the interval between the two GMR ferromagnetic layers 33a and 33b can be adjusted as desired by the thickness of the separating nonmagnetic intermediate layer 36.

Then, the differential detection type MR head 31 of the structure described above, like the differential detection type MR head 21 of the second embodiment described previously, is desired to adopt at least one of the structures of (a) through (c) described above so that the spin-dependent scattering ability may not be degraded and the magnetizations $M_{b1}$ and $M_{b2}$ of the first and the second low-permeability ferromagnetic layers 35a and 35b may not be varied by a signal magnetic field. These structures have been already described specifically.

The differential detection type MR heads 21 and 31 respectively of the second and the third embodiment above-described may have ferromagnetic layers for the detection of signal magnetic fields disposed one each outside the GMR ferromagnetic layers in the same manner as in the first embodiment.

Next, the fourth embodiment of this invention will be described below with reference to FIG. 11.

Figure 11:
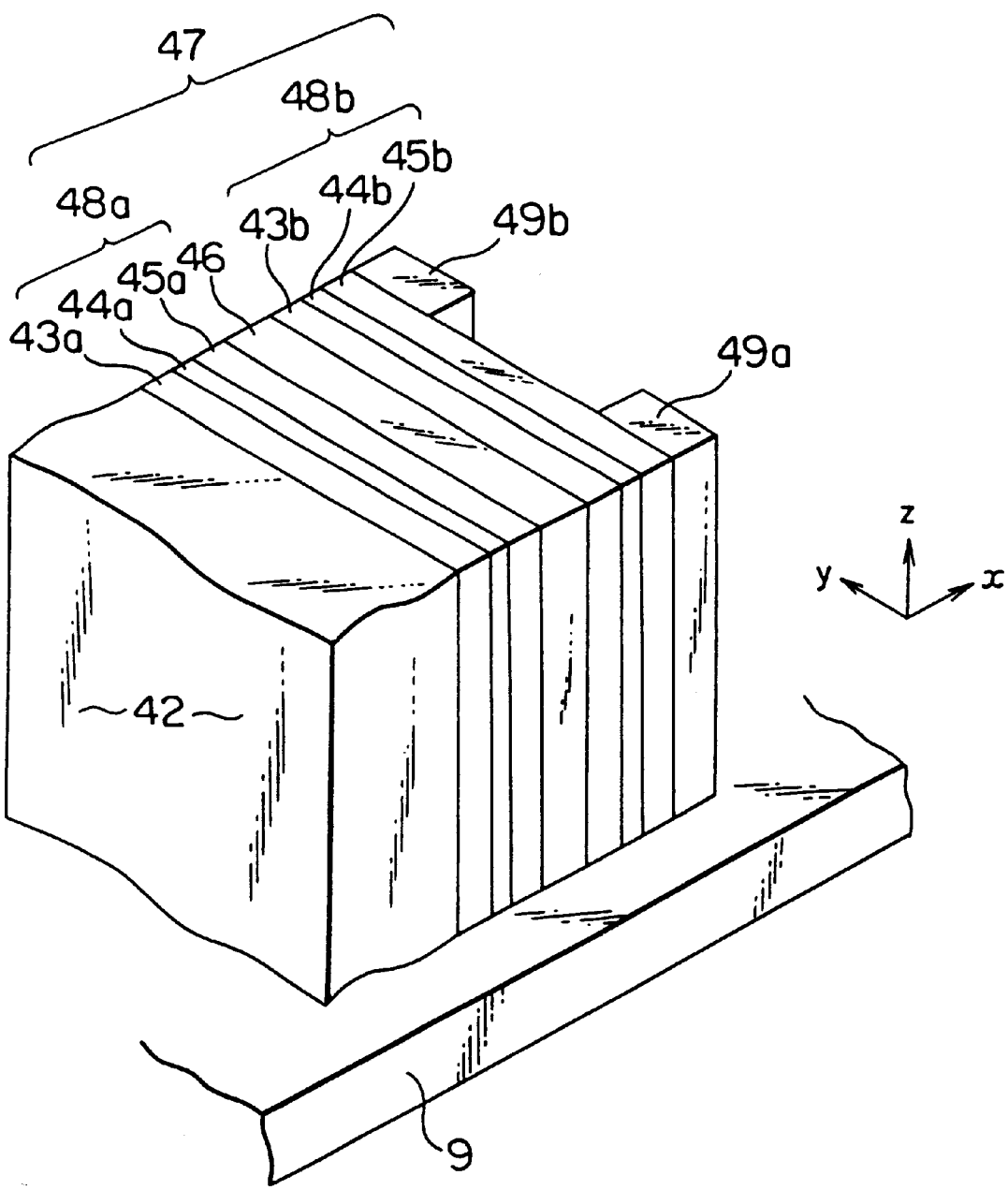
FIG. 11 is a perspective view illustrating the essential construction of a differential detection type MR head as the fourth em of this invention.

In a differential detection type MR head 41 shown in FIG. 11, a first low-permeability ferromagnetic layer 43a, a first GMR nonmagnetic intermediate layer 44, a first GMR ferromagnetic layer 45a, a separating nonmagnetic intermediate layer 46, a second low-permeability ferromagnetic layer 43b, a second GMR nonmagnetic intermediate layer 44b, and a second GMR ferromagnetic layer 45b are sequentially superposed in the order mentioned on a substrate 42. The laminated structure thus formed constitutes itself a GMR element part 47.

The first low-permeability ferromagnetic layer 43a, the first GMR nonmagnetic intermediate layer 44a, and the first GMR ferromagnetic layer 45a jointly form a first GMR unit 48a and the second low-permeability ferromagnetic layer 43b, the second GMR nonmagnetic intermediate layer 44b, and the second GMR ferromagnetic layer 45b jointly form a second GMR unit 48b. Further, electrodes 49a and 49b for supplying a sense current in the direction of track width (the y direction in the diagram) are formed one each at the opposite ends of the GMR element part 47. These components complete the differential detection type MR head 41.

The materials and the thicknesses of the component layers of the GMR element part 47 are similar to those of the component layers of the differential detection type MR head 31 of the third embodiment described above. Further, for the sake of augmenting the coercive force and the uniaxial magnetic anisotropy of the first low-permeability ferromagnetic layer 43a, a nonmagnetic film made of Cr or Ta may be interposed between the substrate 42 and the first low-permeability ferromagnetic layer 43a.

Figure 12:
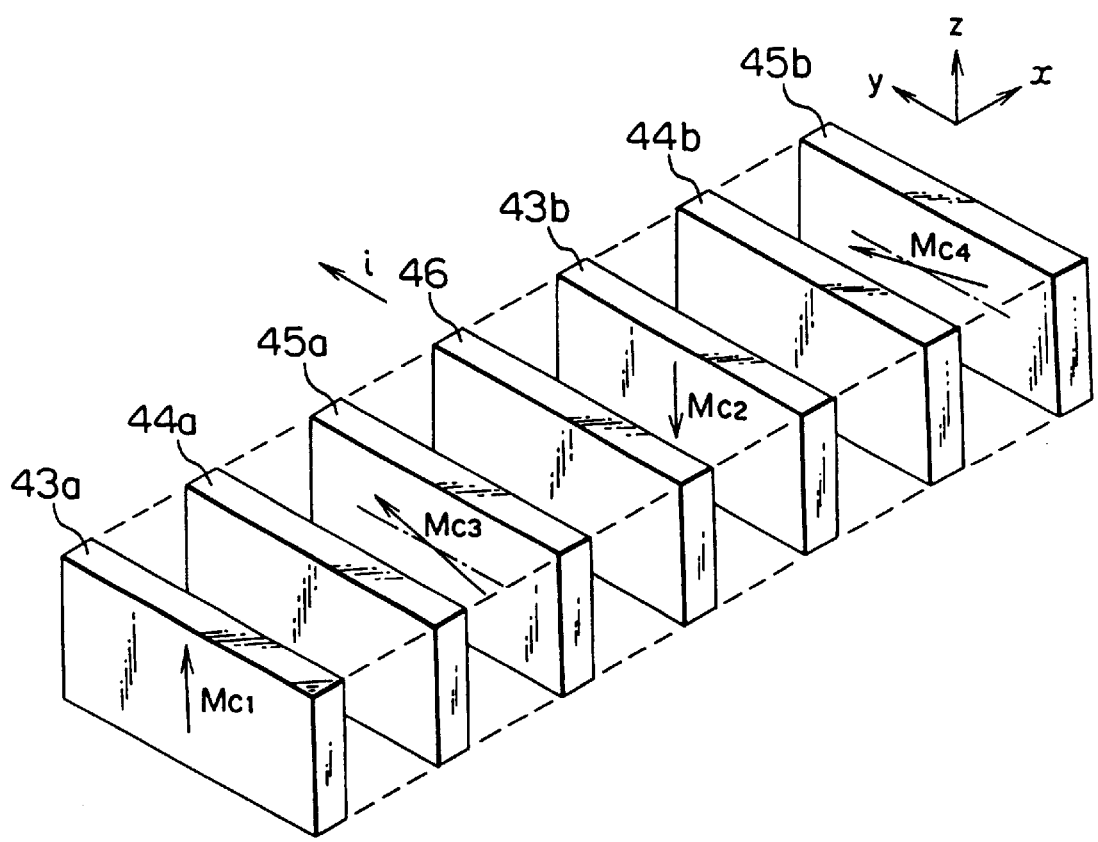
FIG. 12 is a diagram illustrating the state of magnetization of the differential detection type MR head shown in FIG. 11 with the signal magnetic field in a state of zero.

With this differential detection type MR head 41, like the differential detection type MR head 31 of the third embodiment, the same differential detection type detection of a magnetic field as is attained by the third embodiment can be realized by causing the magnetizations $M_{c1}$ and $M_{c2}$ of the first and the second low-permeability ferromagnetic layers 43a and 43b to be respectively turned in the plus z direction and the minus z direction as shown in FIG. 12. According to this structure, for the separating nonmagnetic intermediate layer 46 which is destined to serve as a foundation for the first low-permeability ferromagnetic layer 43a and as a foundation for the second low-permeability ferromagnetic layer 43b, such a Cr film as is adapted for heightening the coercive force and the uniaxial magnetic anisotropy of the first and the second low-permeability ferromagnetic layer 43a and 43b can be used. The use of this Cr film is at an advantage in stabilizing the magnetizations of the first and the second low-permeability ferromagnetic layers 43a and 43b to resist the magnetic field of the medium. The fact that a magnetostatically coupling magnetic field is generated between the first and the second low-permeable ferromagnetic layer 43a and 43b and the stability to resist signal magnetic fields is further improved has an exact equivalent in the third embodiment. The desire to impart a deviation of 180° between the directions of the magnetizations of the first and the second low-permeability ferromagnetic layer 43a and 43b may be satisfied, in the same manner as in the third embodiment, by varying the film-forming conditions of the low-permeability ferromagnetic layer 43a and 43b or by using different foundations therefor.

Then, the fifth embodiment of this invention will be described below with reference to FIG. 13.

Figure 13:
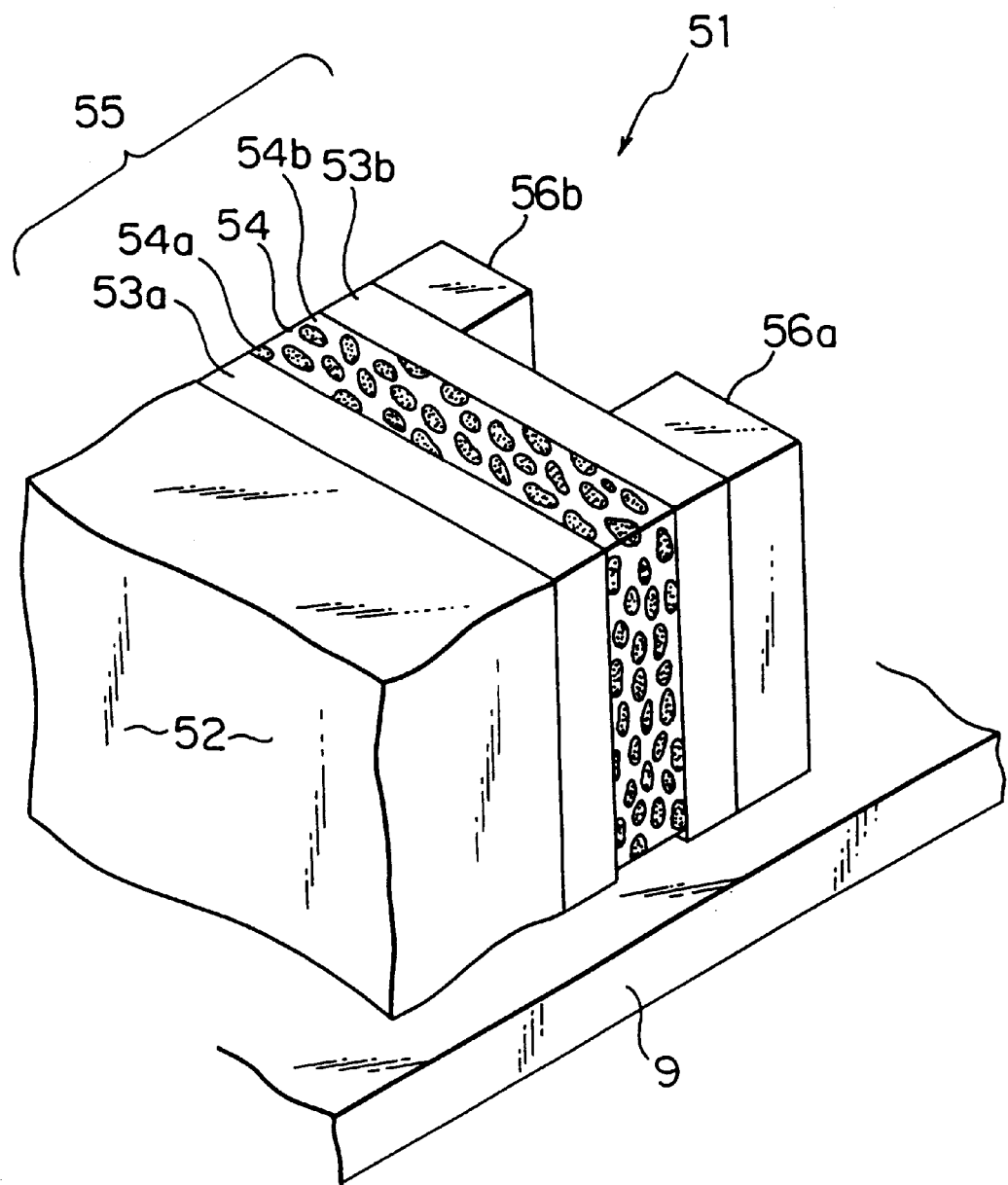
FIG. 13 is a perspective view illustrating the essential construction of a differential detection type MR head as the fifth embodiment of this invention.

In a differential detection type MR head 52 shown in FIG. 13, a first signal magnetic field detecting ferromagnetic layer 53a, a granular type ferromagnetic intermediate layer 54 intended as an intermediate layer, and a second signal magnetic field detecting magnetic layer 53b are sequentially superposed in the order mentioned on a substrate 52 to form a differential detection type MR element 55. Further, electrodes 56a and 56b for supplying a sense current are formed one each at the opposite ends of the differential detection type MR element 55.

The granular type ferromagnetic intermediate layer 54 has a phase separation into a magnetic region 54a and a nonmagnetic region 54b. In the magnetic region 54a, the resistance generated therein decreases in proportion to the increase of the components having magnetizations arranged in equal directions and increases in proportion to the increase of the components of antiparallel magnetizations. In the present differential detection type MR head 51, therefore, the granular type ferromagnetic intermediate layer 54 functions as a GMR element part. The granular type ferromagnetic intermediate layer 54 has a thickness of about 30 nm, for example, and the magnetic region 54a thereof is formed of a magnetic material having Co, Ni, Fe, etc. as a main component thereof, and the nonmagnetic region 54b thereof is formed of a nonmagnetic material such as of Cu, Au, Ag, alloys thereof, etc.

The granular type ferromagnetic intermediate layer 54 is desired to be magnetized with a ferromagnetic field or to be provided with a bias film, as in any of the structures shown in FIG. 2 through FIG. 5, so as to arrange the magnetizations of the magnetic region 54a in substantially equal directions with the signal magnetic field in a state of zero. As a result, the granular type ferromagnetic intermediate layer 54 equals a substantial gap and permits formation of a gap of a suitable length in the approximate range of from 10 to 100 nm.

When the granular type ferromagnetic intermediate layer 54 destined to serve as a gap is positioned as separated from the magnetization transition region of the magnetic recording medium 9 and signal magnetic fields of equal directions are applied to the first and the second signal magnetic field detecting ferromagnetic layer 53a and 53b, the magnetizations of these layers 53a and 53b are rotated in mutually equal directions and the magnetizations within the magnetic region 54a of the granular type ferromagnetic intermediate layer 54 are consequently rotated in the equal directions and the angle formed by the magnetizations is not varied after all. In the granular type ferromagnetic intermediate layer 54, therefore, the resistance is not varied substantially. When the granular type ferromagnetic intermediate layer 54 destined to serve as a gap exists directly above the magnetization transition region of the magnetic recording medium 9 and signal magnetic fields of mutual opposite directions are applied to the first and the second signal magnetic field detecting ferromagnetic layer 53a and 53b, the magnetizations of these layers 53a and 53b are rotated in mutual opposite directions near the interfaces of the ferromagnetic layers 53a and 53b and, as a result, the magnetizations in the magnetic region 54a within the granular type ferromagnetic intermediate layer 54 have increased antiparallel components. As a result, the resistance of the granular type ferromagnetic intermediate layer 54 increases and permits detection of the recorded information.

The differential detection type MR head 51 of the present embodiment, like the equivalent in any of the embodiments cited above, functions as a read head for displaying a differential detection type output response in the magnetization transition region of the magnetic recording medium 9. Then, it produces the differential detection by utilizing the resistance which varies with the angle formed by the magnetizations in the magnetic region 54a of the granular type ferromagnetic layer 54 and, therefore, realizes the reading with high sensitivity and a high S/N ratio which has never been attained by the conventional AMR element. Further, by setting the gap length suitably with the thickness of the granular type ferromagnetic intermediate layer 54 as described above, the reading of such notably high linear recording density as not more than 0.1 $\mu$m can be realized with high sensitivity.

As clearly demonstrated by the embodiments cited above, the differential detection type MR head of this invention is capable of stably obtaining a differential detection type output response and allows realization of the reading of notably high linear recording density with high sensitivity.

What is claimed is:

1. A differential detection magnetoresistance head comprising:
   a magnetoresistance element part having a laminated structure, the magnetoresistance element part having a resistance and comprising:
      a pair of ferromagnetic layers, each having a magnetization, and
      an intermediate layer interposed between said pair of ferromagnetic layers, said intermediate layer being formed of an electrically conductive material suitable for spin-dependent scattering; and
   a pair of signal magnetic field detecting ferromagnetic layers, each of the signal magnetic field detecting ferromagnetic layers being disposed outside each of the ferromagnetic layers,
   wherein the resistance of said magnetoresistance element part is varied when the magnetization of each of the ferromagnetic layers is changed to an opposite direction by signal magnetic fields, and wherein recorded information on a magnetic medium is detected utilizing the variation of resistance based on a giant magnetoresistance effect due to the spin-dependent scattering in said magnetoresistance element part, said pair of ferromagnetic layers is recessed from said pair of signal magnetic field detecting ferromagnetic layers relative to a surface of the magnetoresistance head facing the magnetic medium.

* * * * *

UNITED STATES PATENT AND TRADEMARK OFFICE
CERTIFICATE OF CORRECTION

PATENT NO.    : 6,483,673 B1
DATED         : November 19, 2002
INVENTOR(S)   : Iwasaki et al.

It is certified that error appears in the above-identified patent and that said Letters Patent is hereby corrected as shown below:

Title page,
Item [57], ABSTRACT,
Line 11, change "ferromagnetic layer" to -- ferromagnetic layers --.

Signed and Sealed this

Fourth Day of March, 2003

JAMES E. ROGAN
*Director of the United States Patent and Trademark Office*